(12) United States Patent
Suga et al.

(10) Patent No.: US 6,395,675 B1
(45) Date of Patent: *May 28, 2002

(54) CATALYST SYSTEM FOR PURIFYING OXYGEN RICH EXHAUST GAS

(75) Inventors: Katsuo Suga, Yokohama; Masanori Nakamura, Kanagawa, both of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/263,836

(22) Filed: Mar. 8, 1999

(30) Foreign Application Priority Data

| Mar. 9, 1998 | (JP) | 10-056530 |
| Jul. 30, 1998 | (JP) | 10-215343 |
| Aug. 7, 1998 | (JP) | 10-224151 |

(51) Int. Cl.[7] .......................... B01J 23/40; B01J 23/58; B01J 23/44; B01J 23/42; B01J 23/00
(52) U.S. Cl. ................. 502/326; 502/302; 502/308; 502/304; 502/327; 502/328; 502/333; 502/334; 502/335; 502/336; 502/337; 502/338; 502/339; 502/527.12; 502/527.13; 502/527.15
(58) Field of Search ........................... 423/239.1, 213.5, 423/594, 598, 599, 600; 502/302, 303, 304, 326, 327, 328, 332–341, 349–351, 355, 439, 527.12, 527.13, 527.15

(56) References Cited

U.S. PATENT DOCUMENTS

| 4,843,056 A | * 6/1989 | Matsumoto et al. ........ 502/302 |
| 4,849,398 A | * 7/1989 | Takada et al. ............. 502/303 |
| 5,141,714 A | * 8/1992 | Obuchi et al. ............. 422/174 |

(List continued on next page.)

FOREIGN PATENT DOCUMENTS

| DE | 3726580 C | * 3/1988 |
| EP | 0 532 024 | 3/1993 |
| EP | 0 582 917 | 2/1994 |
| GB | 2 322 309 | 6/1998 |
| JP | 01030641 A | * 2/1989 |
| JP | 401168343 A | * 7/1989 |
| JP | 03077642 A | * 4/1991 |
| JP | 5-168860 | 7/1993 |
| JP | 6-58138 | 3/1994 |
| JP | 9-184441 | 7/1997 |

OTHER PUBLICATIONS

Voorhoeve; "Perovskite–Related Oxides as Oxidation–Reduction Catalysis"; Advanced Materials in Catalysis; 1997; pp. 129–180; XP–002129190.

Voorhoeve et al.; "Perovskite–like $La_{1-x}K_xMnO_3$ and Related Compounds: Solid State Chemistry and the Catalysis of the Reduction of NO by CO and $H_2$"; J. Solid State Chem.; vol. 14; 1995; pp. 395–406; XP–000874193.

(List continued on next page.)

Primary Examiner—Steven P. Griffin
Assistant Examiner—Cam N. Nguyen
(74) Attorney, Agent, or Firm—Foley & Lardner

(57) ABSTRACT

A device (catalytic converter) for purifying an exhaust gas. This device has a first catalyst for purifying a NOx of the exhaust gas. This first catalyst contains first and second powders. The first powder has a porous carrier and at least one noble metal loaded on the porous carrier. The at least one noble metal is selected from platinum, palladium and rhodium. The second powder has a first double oxide represented by the general formula $(Ln_{1-\alpha}A_\alpha)_{1-\beta}BO_\delta$ where $\alpha$ is a number that is greater than 0 and less than 1, $\beta$ is a number that is greater than 0 and less than 1, $\delta$ is a number that is greater than 0, Ln is at least one first element selected from La, Ce, Nd and Sm, A is at least one second element selected from Mg, Ca, Sr, Ba, Na, K and Cs, and B is at least one third element selected from Fe, Co, Ni and Mn. The device is improved in capability of purifying NOx contained in an oxygen rich exhaust gas.

32 Claims, 1 Drawing Sheet

U.S. PATENT DOCUMENTS

| | | | | |
|---|---|---|---|---|
| 5,212,142 A | * | 5/1993 | Dettling | 502/304 |
| 5,409,671 A | * | 4/1995 | Takemoto et al. | 422/180 |
| 5,427,989 A | * | 6/1995 | Kanesaka et al. | 502/66 |
| 5,447,705 A | * | 9/1995 | Petit et al. | 423/418.2 |
| 5,472,673 A | | 12/1995 | Goto et al. | 422/169 |
| 5,559,073 A | * | 9/1996 | Hu et al. | 502/302 |
| 5,575,983 A | * | 11/1996 | Suzuki et al. | 423/213.5 |
| 5,622,680 A | * | 4/1997 | Monceaux et al. | 423/213.5 |
| 5,756,057 A | * | 5/1998 | Tsuchitani et al. | 423/213.2 |
| 5,801,114 A | * | 9/1998 | Durand et al. | 502/302 |
| 5,811,364 A | * | 9/1998 | Suga et al. | 502/328 |
| 5,830,822 A | * | 11/1998 | Euzen | 502/355 |
| 5,849,254 A | * | 12/1998 | Suzuki et al. | 423/213.5 |
| 5,894,068 A | * | 4/1999 | Kharas et al. | 502/327 |
| 5,990,038 A | * | 11/1999 | Suga et al. | 502/303 |
| 6,045,764 A | * | 4/2000 | Iizuka et al. | 423/213.5 |
| 6,143,691 A | * | 11/2000 | Shiraishi et al. | 502/304 |

OTHER PUBLICATIONS

Database WPI; Section Ch., week 199723; Class H06, AN 1997–255226; XP–002129191; JP 09 086928; Mar. 31, 1997; Abstract.

Database WPI; Section Ch., week 199530; Class E36, AN 1995–227597; XP–002129192; JP 07 136518; May 30, 1995; Abstract.

* cited by examiner

FIGURE
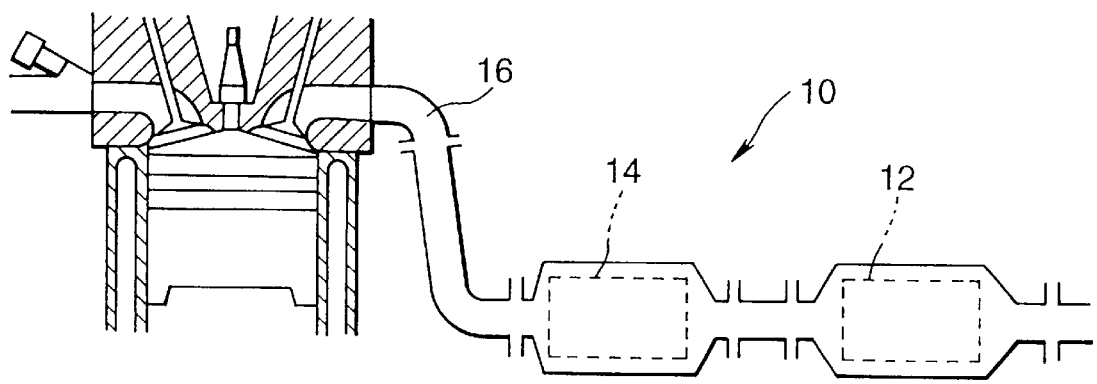

US 6,395,675 B1

CATALYST SYSTEM FOR PURIFYING OXYGEN RICH EXHAUST GAS

BACKGROUND OF THE INVENTION

The present invention relates to a device (catalytic converter) for purifying hydrocarbons (HC), carbon monoxide (CO) and nitrogen oxides (NOx), which are contained in the exhaust gas from the internal-combustion engine of automobiles and boilers. The present invention relates in particular to a catalyst which is capable of purifying an oxygen rich exhaust gas by removing NOx contained in the oxygen rich exhaust gas.

In recent years, there has been a large demand for low-fuel-consumption automobiles, in view of the possibility of exhaustion of the petroleum resources and the global warming problems. In particular, there is a strong demand for lean-burn automobiles in the field of gasoline-engine automobiles. Such a lean-burn automobile is driven on the lean side with a large air-fuel ratio (A/F) as much as possible during an ordinary driving, so as to burn an oxygen rich air-fuel mixture and thereby meet with the demands for lower fuel consumption. JP-A-9-184441 discloses an air-fuel ratio control device of an internal combustion engine, which may be driven on the lean side. In case of an oxygen rich (lean) air-fuel mixture, the oxygen content of an exhaust gas after combustion becomes high. If this exhaust gas is allowed to flow through a conventional three-way catalyst, the oxidation action becomes more active and the reduction action becomes inactive. In view of this, it has been desired to provide a catalyst that can sufficiently remove NOx by reducing NOx to $N_2$ even on the lean side, that is, in an oxygen rich exhaust gas. Japanese Patent Unexamined Publication JP-A-5-168860 discloses a catalyst having a porous carrier supporting thereon platinum and lanthanum.

If sulfur is contained in the fuel and/or lubrication oil, this sulfur may be exhausted in the form of sulfur oxide into the exhaust gas. This sulfur oxide may reduce the NOx purification capability of the above-mentioned catalyst that is capable of removing NOx. Thus, it is desired to provide a catalyst that is capable of suppressing such reduction of the NOx purification capability caused by sulfur. U.S. Pat. No. 5,472,673, which corresponds to JP-A-6-58138, discloses an exhaust gas purification device having a sulfur trapping device.

SUMMARY OF THE INVENTION

It is an object of the present invention to provide a device for purifying an exhaust gas, which is improved in capability of purifying NOx contained in an oxygen rich exhaust gas.

According to the present invention, there is provided a device for purifying an exhaust gas. This device comprises a first catalyst for purifying a NOx of the exhaust gas. This first catalyst comprises first and second powders. The first powder comprises a porous carrier and at least one noble metal loaded on the porous carrier. The at least one noble metal is selected from the group consisting of platinum, palladium and rhodium. The second powder comprises a first double oxide represented by the following general formula (1):

$$(Ln_{1-\alpha}A_\alpha)_{1-\beta}BO_\delta \tag{1}$$

where $\alpha$ is a number that is greater than 0 and less than 1, $\beta$ is a number that is greater than 0 and less than 1, $\delta$ is a number that is greater than 0, Ln is at least one first element selected from the group consisting of La, Ce, Nd and Sm, A is at least one second element selected from the group consisting of Mg, Ca, Sr, Ba, Na, K and Cs, and B is at least one third element selected from the group consisting of Fe, Co, Ni and Mn.

BRIEF DESCRIPTION OF THE DRAWINGS

FIGURE is a schematic view showing an engine equipped with a device for purifying an exhaust gas therefrom according to the second preferred embodiment of the invention.

DESCRIPTION OF THE PREFERRED EMBODIMENTS

A device (catalytic converter) for purifying an exhaust gas according to the first preferred embodiment of the invention will be described in detail in the following. This device will be referred to as "the first device" for simplification, too. In fact, according to the first preferred embodiment, the first device is made up of only the above-mentioned first catalyst of the invention, and thus the first device and the first catalyst are equivalent to each other.

As stated above, the first catalyst contains the first powder containing a porous carrier and at least one noble metal selected from platinum (Pt), palladium (Pd) and rhodium (Rh). As the at least one noble metal, it is preferable to use only Pd or a combination of Pd and Rh. With this, the first catalyst is improved in NOx absorption capability, due to the interaction of the above-mentioned first double oxide of the second powder and the at least one noble metal. The amount of the at least one noble metal is not particularly limited, so long as the first catalyst becomes sufficient in capability of absorbing NOx and capability as a three-way catalyst. The amount of the at least one noble metal is preferably from 0.1 to 10 g per liter of the first catalyst. If it is less than 0.1 g, the first catalyst may become insufficient in capability as a three-way catalyst. If it is greater than 10 g, it may not be possible to obtain further significant advantageous effects. As will be clarified hereinafter, the first catalyst optionally comprises a substrate for supporting thereon a catalytic coating containing the first and second powders. It should be noted that the total apparent volume of the substrate is almost equal to that of the first catalyst. Therefore, the substrate and the first catalyst are interchangeable with each other in terms of apparent volume.

At least part of the at least one noble metal is preferably loaded on a porous carrier, preferably on alumina. Such alumina is preferably one having a high heat resistance. In particular, it is preferable to use an activated alumina having a specific surface area of 50–300 $m^2/g$. It is optional to add an additive, such as rare earth elements (e.g., cerium and lanthanum) and zirconium, to an alumina as the porous carrier, in order to improve the alumina in heat resistance. Furthermore, it is optional to add an additive that has been conventionally used for a three-way catalyst, to the first catalyst, in order to improve the first catalyst in capability as a three-way catalyst under a so-called stoichiometric condition. Examples of such additive are ceria, barium and zirconia. In fact, ceria has a function of storing oxygen. Barium has a function of reducing the deterioration of the noble metal caused by adhesion of hydrocarbons (HC) to the noble metal. Zirconia contributes to the improvement of rhodium in heat resistance. As shown in the general formula (1), the first double oxide of the second powder contains (1) at least one first element selected from rare earth elements of La, Ce, Nd and Sm, (2) at least one second element selected from alkali metals of K, Na and Cs and alkali earth metals of Mg, Ca, Sr and Ba, and (3) at least one third element selected from transition metals of Fe, Co, Ni and Mn. The first double oxide, which has an A-site-deficient perovskite structure as shown in the general formula (1), has the oxygen deficiency. Due to this oxygen deficiency, NOx may easily be adsorbed on the first double oxide under the lean condition. This contributes to the improvement of the first catalyst in capability of purifying NOx. In general, conventional perovskite-type double oxides tend to react with alumina contained in the catalyst, as a solid phase reaction. This reaction may inactivate the conventional perovskite-type double oxides in catalytic activity. In order to prevent this inactivation, the alumina may be coated, for example, with lanthanum, before the alumina is brought into contact with a conventional perovskite-type double oxide. Alternatively, the alumina may be replaced with another element, such as zirconia, which is less reactive with conventional perovskite-type double oxides. In contrast with such conventional perovskite-type double oxides, the first double oxide according to the invention has an A-site-deficient perovskite structure. With this, it becomes possible to prevent a solid phase reaction of the first double oxide with another oxide (e.g., alumina) contained in the first catalyst. Thus, the first double oxide is improved in thermal stability. Therefore, the first double oxide is kept having a high NOx absorption capability, even after the passage of an exhaust gas of high temperature through the first catalyst. Thus, the first catalyst becomes high in NOx purification capability, even after that.

As stated above, α of the general formula (1) is greater than 0 and less than 1. In particular, α is preferably not less than 0.2. It is preferable that β of the general formula (1) is greater than 0 and less than 1. If β is not less than 1, the first double oxide does not have a single-phase perovskite structure. As stated above, δ of the general formula (1) is greater than 0 and preferably less than about 4. In the invention, the first double oxide has a capability to absorb NOx under the lean condition, because a part of the element A has been replaced with the element Ln, as shown in the general formula (1). In connection with this, it is assumed that NOx (e.g., NO) of the exhaust gas is oxidized into $NO_2$ on the first double oxide, and then this $NO_2$ is absorbed, in the form of nitrate group or a similar one, into a site close to the at least one second element selected from Mg, Ca, Sr, Ba, Na, K and Cs of the first double oxide. In other words, it is important in the invention that the first double oxide contains the at least one second element, which easily reacts with $NO_2$ to form a nitrate(s). It is also important in the invention that the first double oxide further contains the at least one third element selected from transition metals of Fe, Co, No and Mn, which is capable of oxidizing NOx into $NO_2$. In the invention, a part of the first double oxide represented by the general formula (1) may be replaced, for example, with a mixture of an oxide of the element Ln, an oxide of the element "A" and an oxide of the element B where Ln, A and B are defined as in the general formula (1). The desired functions of the first double oxide can be obtained in this case, too. However, according to the invention, it is preferable not to conduct the above-mentioned partial replacement of the first double oxide, in order to maximize the functions of the first double oxide. Even after the passage of an exhaust gas of high temperature through the first catalyst, the first double oxide exists as it is, without the decomposition of the first double oxide into oxides of the constituent elements (Ln, A and B). The existence of a double oxide can be confirmed by X-ray diffraction analysis. The first double oxide may contain small amounts of impurities, as long as the impurities do not interfere with the functions of the first double oxide. In fact, barium may contain a small amount of strontium, and lanthanum may contain a small amount of cerium, neodymium and/or samarium. In other words, the raw materials (i.e., salts of the elements Ln, A and B) may contain small amounts of such impurities.

The amount of the first double oxide is not particularly limited and is preferably from 20 to 100 g per liter of the first catalyst. In the invention, the at least one noble metal of the first powder is coexistent, in the first catalyst, with the first double oxide of the second powder. Due to this coexistence, the first catalyst is unexpectedly improved in NOx purification capability. In other words, the first double oxide absorbs NOx under the lean condition. Then, under the stoichiometric or fuel-rich condition, the absorbed NOx is desorbed from the first double oxide and then is reduced or purified into $N_2$ in the presence of the at least one noble metal.

In the invention, it is preferable that each of the first and second powders has an average or mean particle diameter of not greater than 4 μm. With this, the first catalyst is improved in NOx absorption capability. This improvement becomes greater, if the flow rate of the exhaust gas through the first catalyst becomes slower. In fact, the average or mean particle diameter is more preferably from 2 to 4 μm. The average particle diameter of the first or second powder is substantially the same as the mean particle diameter thereof. Thus, it is needless to say that the first and second powders each having a mean particle diameter of not greater than 4 μm are also included in the scope of the invention, although the term "average particle diameter" is used in the claims in place of the term "mean particle diameter". The average or mean particle diameter of the powders used in the invention can be determined by using a laser-diffraction-type particle diameter distribution meter.

It is preferable that the first catalyst further contains at least one fourth element selected from alkali metals and alkali earth metals, in order to improve the catalytic activity of the first catalyst under a low temperature condition and a reduced (oxygen deficient) condition. The at least one fourth element may be selected from lithium, sodium, potassium, cerium, magnesium, calcium, strontium, and barium. Its content is preferably from 1 to 40 g per liter of the first catalyst. If it is less than 1 g, it may be difficult to suppress the sintering of palladium and the deterioration of the first catalyst caused by the HC adhesion thereto. If it is greater than 40 g, it may be impossible to obtain a further advantageous effect(s). The at least one fourth element may be improved in dispersibility in the first catalyst by adjusting the average or mean particle diameter of each of the first and second powders to not greater than 4 μm, as mentioned above. The raw material of the at least one fourth element may be applied by impregnation to the coated substrate having a catalytic coating made of the first and second powders, as shown in the after-mentioned Examples 1-7 to 1-8. Then, the resultant coated substrate may be dried and then baked at a temperature of 200–600° C. in the air and/or under the air flow. With this baking, the at least one fourth element takes an oxide form. This oxide of the at least one fourth element does not easily react with another element of the first catalyst and thus does not easily turn into a double oxide. If the baking temperature is lower than 200° C., it may be difficult to form an oxide of the at least one fourth element. If it is higher than 600° C., the raw material (salt) of the at least one fourth element may decompose rapidly. With this, the substrate may be broken. The raw material of the at least one fourth element preferably takes a water-soluble form, such as oxide, acetate, hydroxide, nitrate and carbonate. With this, it becomes possible to well disperse the at least one fourth element to sites close to, for example, palladium. If a combination of alkali metal and alkali earth metal is used as the at least one fourth element, it is possible to apply an alkali metal compound(s) and an alkali earth metal compound(s) at the same time or separately to the above-mentioned coated substrate.

The method for producing the first double oxide is not particular limited. For example, the method may comprise (a) mixing together salts (e.g., nitrate, acetate, carbonate, citrate and hydrochloride) of all the elements Ln, A and B of the general formula (1) by amounts to adjust the first double oxide to having a desired chemical composition; (b) preliminarily baking the resultant mixture, followed by grinding; and (c) baking the ground mixture into the first double oxide. Alternatively, the method may comprise (a) mixing together salts of all the elements Ln, A and B by amounts to adjust the first double oxide to having a desired chemical composition; (b) dissolving the resultant mixture into water; (c) optionally adding an alkali solution (e.g., $NH_4OH$ and $NH_3OH$) dropwise to the resultant aqueous solution, thereby to form a precipitate; and (d) drying the precipitate, followed by baking of the same, thereby to obtain the first double oxide. By using one of the above-mentioned methods, it is possible to make at least part of the elements Ln, A and B take the form of the first double oxide represented by the general formula (1).

The method of loading the at least one noble metal on the porous carrier in the preparation of the first powder is not particularly limited, and may be one of conventional methods, such as drying through evaporation, deposition, impregnation, and ion-exchange, so long as the distribution of the at least one noble metal on the porous carrier does not become substantially lopsided. In fact, it is preferable to take impregnation, if alumina is used as the porous carrier. The raw material of the at least one noble metal may take the form of salt of inorganic acid, carbonate, ammonium salt, salt of organic acid, halide, oxide, sodium salt, ammine complex and mixtures thereof. In particular, it is preferable to use the raw material in the form of water-soluble salt, in terms of the improvement of the catalytic activity of the at least one noble metal of the first powder. In cases of ion-exchange and impregnation, the at least one noble metal may be dissolved in a solution. In this case, it is optional to adjust pH of the solution by adding an acid or base thereto. By adjusting pH, it may be possible to make the at least one noble metal higher in dispersibility on the porous carrier.

The first catalyst may be prepared by a method comprising: (a) preparing an aqueous slurry containing therein the first and second powders; (b) applying the aqueous slurry to a substrate of the first catalyst, such that a precursor of a catalytic coating of the first catalyst is formed on the substrate; and (c) baking the precursor into the catalytic coating. In fact, the baking is conducted preferably at a temperature of 400–900° C. Prior to the application of the aqueous slurry, the aqueous slurry is preferably subjected to a wet grinding, thereby to adjust each of the first and second powders to having an average or mean particle diameter of not greater than 4 $\mu$m. The device for conducing the wet grinding is not particularly limited. In fact, it is possible to use a commercial ball-type vibrating mill. A desired particle diameter of the first and second powders may be obtained by adjusting the ball diameter of the mill, the period of time for conducting the wet grinding, the vibration amplitude, and the vibration frequency. The substrate of the first catalyst is not particularly limited and may be selected from conventional ones. For example, it is optional to use a heat resistant monolithic (honeycomb) substrate made of a ceramic (e.g., cordierite) or metal material (e.g., ferrite-based stainless steel). Alternatively, it is optional to mold a mixture of the first and second powders into a honeycomb shape, without using a substrate. In other words, the resultant honeycomb made of the first and second powders may be used as the first catalyst.

A device (catalytic converter) for purifying an exhaust gas according to the second preferred embodiment of the invention will be described in detail in the following. This device will be referred to as "the second device" for simplification. In fact, according to the second preferred embodiment, as shown in Figure, the second device 10 comprises the above-mentioned first catalyst 12 and a second catalyst 14 arranged upstream of the first catalyst 12 in a passage 16 of the exhaust gas. Thus, the above descriptions of the first catalyst of the first preferred embodiment will not be repeated here.

The second catalyst (i.e., the upstream catalyst) comprises at least one special component that is capable of absorbing sulfur oxides of the exhaust gas under the lean condition and is capable of releasing or desorbing the sulfur oxides therefrom under the stoichiometric or fuel-rich condition. Thus, an exhaust gas that is substantially free from sulfur oxides is allowed to flow under the lean condition through the first catalyst (i.e., the downstream catalyst). Therefore, under the lean condition, the downstream NOx absorbing catalyst (i.e., the first catalyst) is capable of effectively absorbing only NOx, without having the NOx absorption reduction caused by sulfur oxides. Under the stoichiometric or fuel-rich condition, the absorbed sulfur oxides are released from the second catalyst, and at the same time the absorbed NOx is released from the first catalyst and then is purified. Under the stoichiometric or fuel-rich condition, the sulfur oxides released from the second catalyst are allowed to flow into the first catalyst. However, the absorption of the sulfur oxides into the first catalyst is substantially suppressed under the stoichiometric or fuel-rich condition. Therefore, it is not necessary to provide a special device for stopping the flow of the sulfur oxides, which have been released from the second catalyst, into the first catalyst.

There are the following four cases as to the above-mentioned at least one special component of the second catalyst. In each of the four cases, the second catalyst is improved in capability to release the absorbed sulfur oxides. In the first case, the at least one special component includes a second double oxide that is a combination of an alumina and at least one fifth element selected from Na, Mg, Ca, Sr, Ba, Y and La. In the first case, the at least one special component may further include at least one sixth element that is selected from Fe, Mn, Co and Ni and is loaded on the second double oxide. With this, the second catalyst may further be improved in capability to release the sulfur oxides. In the second case, the at least one special component includes an alumina and a third double oxide loaded on this alumina. This third double oxide comprises the at least one fifth element and the at least one sixth element. In the third case, the at least one special component includes a fourth double oxide and the at least one fifth element loaded on the fourth double oxide. This fourth double oxide is a combination of an alumina and the at least one sixth element. In the fourth case, the at least one special component includes a fifth double oxide that is a combination of the at least one fifth element, the at least one sixth element, and an alumina. The at least one special component of the second catalyst is preferably in an amount of 0.1–200 g per liter of the second catalyst, for the purpose of effectively absorbing and then effectively desorbing sulfur oxides. In fact, the second catalyst preferably contains 1–30 wt % of the at least one fifth element for the purpose of absorbing and then desorbing sulfur oxides. Furthermore, it preferably contains 0.1–10 wt % of the at least one sixth element for the purpose of accelerating the desorption of the sulfur oxides. The method for preparing each of the second, third, fourth and fifth double oxides may be the same as that of the first double oxide of the first preferred embodiment, and thus its description will not be repeated here.

The second catalyst of the second device preferably further comprises an optional powder containing at least one noble metal that is selected from platinum, palladium and rhodium and loaded on a porous carrier, for the purpose of improving the second catalyst in capability to absorb sulfur oxides. The amount of the at least one noble metal is not particularly limited, and is preferably from 0.1 to 10 g per liter of the second catalyst. The method for preparing this optional powder may be the same as that for preparing the first powder of the first preferred embodiment, and thus its description will not be repeated here.

A device (catalytic converter) for purifying an exhaust gas according to a third preferred embodiment of the invention will be described in detail in the following. This device will be referred to as "the third device" for simplification. In fact, according to the third preferred embodiment, the third device comprises a first catalyst having a multilayered catalytic coating. This first catalyst comprises a refractory inorganic substrate; a base layer formed on the substrate; and a surface layer formed on the base layer. As will be clarified hereinafter, becomes possible to substantially suppress the direct contact of sulfur oxides of the exhaust gas with the NOx absorbing component of the base layer by forming the surface layer on the base layer. The surface layer preferably contains the aftermentioned special element as a sulfur trapping component. Therefore, the surface layer absorbs sulfur oxides under the lean condition and then releases or desorbs the sulfur oxides under the stoichiometric or fuel-rich condition. Due to the release under the stoichiometric or fuel-rich condition, the surface layer is capable of absorbing sulfur oxides again under the subsequent lean condition. Thus, it becomes possible to substantially reduce the amount of sulfur oxides flowing into the base layer.

The base layer and the surface layer respectively comprise first and second elements each being selected from alkali metals, alkali earth metals, rare earth elements and transition metals. The first element of the base layer as a NOx absorbing component is represented by M in the following reaction formula (1) and is such that $dM_p(SO_4)_q$ in a reaction represented by the following reaction formula (1) has a free energy of reaction or Gibbs energy of reaction (ΔG) of not greater than −350 kJ/mol, for example, at 400° C.,

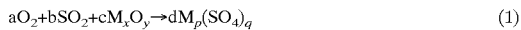

$$aO_2 + bSO_2 + cM_xO_y \rightarrow dM_p(SO_4)_q \quad (1)$$

where a, b, c and d are numbers such that the reaction formula (1) is formed, and x, y, p and q are numbers each being greater than 0. In contrast, the second element of the surface layer as a sulfur trapping component is represented by M' in the following reaction formula (2) and is such that $dM'_p(SO_4)_q$ in a reaction represented by the following reaction formula (2) has a Gibbs energy of reaction (ΔG) of greater than −350 kJ/mol, for example, at 400° C.,

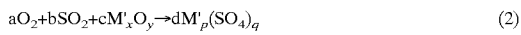

$$aO_2 + bSO_2 + cM'_xO_y \rightarrow dM'_p(SO_4)_q \quad (2)$$

where a, b, c and d are numbers such that the reaction formula (2) is formed, and x, y, p and q are numbers each being greater than 0. Examples of the first element are Na, K, Ba, Cs, and mixtures thereof. In contrast, examples of the second element are Mg, Ca, Fe, Co, La and mixtures thereof.

The above-defined first element of the base layer is extremely high in NOx absorbing or trapping capability. Once sulfur oxides of the exhaust gas reach the base layer, the first element may react with the sulfur oxides under the lean condition, to form sulfates of the first element. These sulfates hardly decompose even under the stoichiometric or fuel-rich condition, and it is necessary to provide a very high temperature for the decomposition. Thus, these sulfates of the base layer may substantially damage the NOx absorbing capability of the base layer. To prevent this damage, the surface layer is formed on the base layer in the third preferred embodiment. The above-defined second element of the surface layer serves as a sulfur trapping component, as will be clarified hereinafter. Once sulfur oxides of the exhaust gas are introduced into the first catalyst, the second element of the surface layer may react with the sulfur oxides under the lean condition, to form sulfates of the second element. Thus, the sulfur oxides of the exhaust gas are almost consumed in the surface layer and thus hardly reach the base layer. Furthermore, the sulfates of the second element formed in the surface layer may block the sulfur oxides from reaching the base layer. Therefore, the base layer is kept having a superior NOx absorbing capability. The sulfates of the second element are easily decomposed under the stoichiometric or fuel-rich condition, thereby to release sulfur oxides from the surface layer. With this, the surface layer regains the sulfur oxide absorption capability to absorb the sulfur oxides under the lean condition. Therefore, the base layer is kept having a superior NOx absorbing capability for a long time by alternating the lean condition and the stoichiometric or fuel-rich condition. If the engine is continuously driven under the lean condition without a so-called rich spike (i.e., an interruption of the lean condition by the stoichiometric or fuel-rich condition), the surface layer continues to absorb sulfur oxides of the exhaust gas and then finally will not absorb them any more. In other words, the sulfur absorption into the surface layer reaches the maximum. Even under this condition, the surface layer serves to substantially block the sulfur oxides from flowing into the base layer. Thus, the base layer is kept having a superior NOx absorbing capability.

The surface layer also has a NOx absorbing capability, but it is inferior to that of the base layer. In fact, the NOx absorption capability of the surface layer may be reduced by the formation of sulfates of the second element under the lean condition. However, as mentioned above, these sulfates are easily decomposed under the subsequent stoichiometric or fuel-rich condition, thereby to release sulfur oxides from the surface layer. With this, the surface layer regains the NOx absorption capability, too.

The weight ratio of the base layer to the surface layer is preferably from 1:3 to 3:1. With this, it becomes possible to have a good balance between the suppression of the above-mentioned adverse sulfur effects on the base layer and the provision of the NOx absorption or purification capability. If this ratio is lower than 1:3, the catalyst may become insufficient in NOx absorption. If this ratio is greater than 3:1, the adverse sulfur effects on the base layer may not sufficiently be suppressed.

The base layer preferably comprises the second powder according to the first preferred embodiment. With this, even though a small amount of sulfur oxides reach the base layer, the sulfur oxides can easily be released from the base layer under the stoichiometric or fuel-rich condition. In other words, it becomes possible to further suppress the adverse sulfur effects on the base layer by adding the second powder to the base layer.

It is preferable to provide an interlayer between the base layer and the surface layer. This interlayer may comprise at least one material selected from zeolite, $TiO_2$, $SiO_2$, and $ZrO_2$. The interlayer serves to further suppress the flow of sulfur oxides into the base layer.

It is preferable to load the first element and/or the second element on a porous carrier, preferably on an alumina, in the preparation of the base layer and/or the surface layer, in order to increase the surface area of the base layer and/or the surface layer. With this, it becomes possible to have a good contact between the exhaust gas and the first element and/or the second element. The alumina is preferably one having a high heat resistance. In particular, it is preferable to use an activated alumina having a specific surface area of about 50–300 $m^2/g$.

It is preferable that each constituent powder of the base and surface layers and the interlayer has an average or mean article diameter of not greater than 4 $\mu$m. With this, the first catalyst becomes substantially large in surface area. Thus, it becomes possible to have a good contact between the exhaust gas and each catalytic component. Therefore, it becomes possible to further increase the NOx absorption capability and the sulfur oxide releasing capability.

If the temperature of the exhaust gas is adjusted to at least 500° C. at least temporarily, preferably for at least 30 seconds, at the inlet of the catalyst, it becomes easier to release the sulfur oxides.

The refractory inorganic substrate of the third preferred embodiment may be the same as the substrate of the first preferred embodiment. Therefore, the descriptions of the latter is applied to the former and thus will not repeated here.

The base layer and/or the surface layer preferably comprises at least one noble metal that is loaded thereon and is selected from platinum, palladium and rhodium, in order to serve as a three-way catalyst under the stoichiometric condition. It is preferable that the at least one noble metal is at least partially loaded on a porous carrier such as activated alumina. This porous carrier having thereon the at least one noble metal corresponds to the first powder according to the first preferred embodiment. It is optional to add an additive, such as rare earth elements (e.g., cerium and lanthanum) and zirconium, to an alumina used as the porous carrier, in order to improve the alumina in heat resistance.

As mentioned in the first preferred embodiment, it is optional to add an additive (e.g., ceria, barium and zirconia) that has conventionally been used for a three-way catalyst, to the first catalyst of the third preferred embodiment, in order to improve the first catalyst in capability as a three-way catalyst under the stoichiometric condition.

The third device optionally comprises a second catalyst that is downstream of the above mentioned first catalyst, in order to further improve the third device in capability as a three-way catalyst. This second catalyst comprises at least one noble metal selected from platinum, palladium and rhodium.

Each of the first, second and third devices according to the first, second and third preferred embodiments of the invention may be used for purifying an exhaust gas from a lean-burn engine having an air-fuel ratio of 10–50 and in particular alternately having a first air-fuel ratio of 10–14.8 and a second air-fuel ratio of 15.0–50 by allowing the exhaust gas to flow through the device during the driving of the engine. In other words, NOx is absorbed or adsorbed under the lean condition (A/F: 15.0–50), and then this NOx is released and purified under the subsequent rich or stoichiometric condition (A/F: 10–14.8).

The following nonlimitative Examples 1-1 to 1-10 are illustrative of the first preferred embodiment of the present invention.

EXAMPLE 1-1

In this example, there was prepared a device (catalytic converter) for purifying an exhaust gas according to the first preferred embodiment of the invention, as follows.

At first, a palladium nitrate aqueous solution was added to an activated alumina powder. Then, the obtained mixture was dried and then baked or calcined at 400° C. for 1 hr, thereby to prepare "powder A", that is, an activated alumina powder supporting thereon palladium. This powder A contained 5.0 wt % of palladium. Separately, a rhodium nitrate aqueous solution was added to an activated alumina powder. Then, the obtained mixture was dried and then baked at 400° C. for 1 hr, thereby to prepare "powder B", that is, a rhodium-supported activated alumina powder. This powder B contained 3.0 wt % of rhodium. Separately, citric acid was added to a mixture of lanthanum carbonate, barium carbonate and cobalt carbonate. Then, the obtained mixture was dried and then baked at 700° C. to prepare "powder C". This powder C contained 2 parts by the number of atoms of La, 7 of Ba and 10 of Co. Thus, the composition of the powder C (double oxide) was

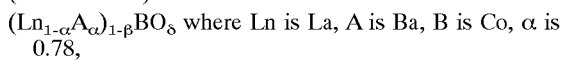

$(Ln_{1-\alpha}A_\alpha)_{1-\beta}BO_\delta$ where Ln is La, A is Ba, B is Co, $\alpha$ is 0.78, and $\beta$ is 0.1, as shown in Table 1-1.

Then, a magnetic ball mill was charged with 347 g of the powder A, 258 g of the powder B, 360 g of the powder C, 300 g of an activated alumina powder, and 900 g of water. Then, this ball mill was driven for 1 hr to mix and grind these ingredients, thereby to obtain a slurry. Then, this slurry was applied to a cordierite monolithic (honeycomb) substrate having a volume of 1.3 liter and 400 cells. Then, an excessive amount of the slurry on the substrate was blown off by allowing air to flow through the cells. After that, the coated substrate was dried at 130° C. and then baked at 400° C. for 1 hr, thereby to obtain the aimed catalytic converter having 200 g of the catalytic coating formed on the substrate per liter of the substrate. The average particle diameter of the powders of this catalytic converter was 3.5 $\mu$m, as shown in Table 1-1. Furthermore, the amounts of the noble metals (Pd and Rh) per liter of the substrate are respectively shown in Table 1-1.

EXAMPLE 1-2

In this example, Example 1-1 was repeated except in that barium used for preparing the powder C was replaced with potassium. The average particle diameter of the powders of the catalytic converter was 3.5 $\mu$m.

EXAMPLE 1-3

In this example, Example 1-1 was repeated except in that barium used for preparing the powder C was replaced with cesium. The average particle diameter of the powders of the catalytic converter was 3.5 $\mu$m.

EXAMPLE 1-4

In this example, Example 1-1 was repeated except in that cobalt used for preparing the powder C was replaced with iron. The average particle diameter of the powders of the catalytic converter was 3.5 $\mu$m.

EXAMPLE 1-5

In this example, Example 1-1 was repeated except in that cobalt used for preparing the powder C was replaced with nickel. The average particle diameter of the powders of the catalytic converter was 3.5 μm.

EXAMPLE 1-6

In this example, Example 1-1 was repeated except in that cobalt used for preparing the powder C was replaced with manganese. The average particle diameter of the powders of the catalytic converter was 3.5 μm.

EXAMPLE 1-7

In this example, the catalytic converter obtained in Example 1-1 was immersed in a barium acetate aqueous solution. Then, the catalytic converter was taken out of this solution and then baked at 400° C. for 1 hr. With this, the obtained catalytic converter contained 30 g of barium on an oxide basis per liter of the substrate. The average particle diameter of the powders of the catalytic converter was 3.5 μm.

EXAMPLE 1-8

In this example, the catalytic converter obtained in Example 1-1 was immersed in a magnesium acetate aqueous solution. Then, the catalytic converter was taken out of this solution and then baked at 400° C. for 1 hr. With this, the obtained catalytic converter contained 30 g of magnesium on an oxide basis per liter of the substrate. The average particle diameter of the powders of the catalytic converter was 3.5 μm.

EXAMPLE 1-9

In this example, Example 1-1 was repeated except in that the slurry was prepared by mixing 509 g of the powder A, 360 g of the powder C, 32 g of the activated alumina powder, and 900 g of water. The average particle diameter of the powders of the catalytic converter was 3.5 μm.

EXAMPLE 1-10

In this example, Example 1-1 was modified, as follows. A dinitrodiammineplatinum aqueous solution was added to an activated alumina powder. The obtained mixture was baked at 400° C. for 1 hr in a dry air, thereby to obtain "powder D", that is, a platinum-supported activated alumina powder. This powder D contained 3.0 wt % of platinum. Then, a magnetic ball mill was charged with 289 g of the powder D, 29 g of the powder B and 360 g of the powder C, which had been obtained in Example 1-1, 222 g of an activated alumina powder, and 900 g of water. Then, a slurry was obtained in the same manner as that of Example 1-1. Using this slurry, the aimed catalytic converter was obtained in the same manners as those of Example 1-1. The obtained catalytic converter had 200 g of a catalytic coating formed on the substrate per liter of the substrate. The average particle diameter of the powders of this catalytic converter was 3.5 μm.

COMPARATIVE EXAMPLE 1-1

In this example, Example 1-1 was repeated except in that the magnetic ball mill was driven for 30 min, in place of 1 hr. The average particle diameter of the powders of the obtained catalytic converter was 4.5 μm.

COMPARATIVE EXAMPLE 1-2

In this example, Example 1-1 was repeated except in that the magnetic ball mill was driven for 20 min, in place of 1 hr. The average particle diameter of the powders of the obtained catalytic converter was 5.5 μm.

TABLE 1-1

| | Noble Metal (g/L) | | | Double Oxide Composition $(Ln_{1-\alpha}A_\alpha)_{1+\beta}BO_\delta$ | | | | | Average Particle Diameter (μm) |
|---|---|---|---|---|---|---|---|---|---|
| | Pt | Pd | Rh | Ln | A | B | α | β | |
| Ex. 1-1 | — | 3.85 | 0.39 | La | Ba | Co | 0.78 | 0.1 | 3.5 |
| Ex. 1-2 | — | 3.85 | 0.39 | La | K | Co | 0.78 | 0.1 | 3.5 |
| Ex. 1-3 | — | 3.85 | 0.39 | La | Cs | Co | 0.78 | 0.1 | 3.5 |
| Ex. 1-4 | — | 3.85 | 0.39 | La | Ba | Fe | 0.78 | 0.1 | 3.5 |
| Ex. 1-5 | — | 3.85 | 0.39 | La | Ba | Ni | 0.78 | 0.1 | 3.5 |
| Ex. 1-6 | — | 3.85 | 0.39 | La | Ba | Mn | 0.78 | 0.1 | 3.5 |
| Ex. 1-7 | — | 3.85 | 0.39 | La | Ba | Co | 0.78 | 0.1 | 3.5 |
| Ex. 1-8 | — | 3.85 | 0.39 | La | Ba | Co | 0.78 | 0.1 | 3.5 |
| Ex. 1-9 | — | 5.65 | — | La | Ba | Co | 0.78 | 0.1 | 3.5 |
| Ex. 1-10 | 1.92 | 0.19 | — | La | Ba | Co | 0.78 | 0.1 | 3.5 |
| Com. Ex. 1-1 | — | 3.85 | 0.39 | La | Ba | Co | 0.78 | 0.1 | 4.5 |
| Com. Ex. 1-2 | — | 3.85 | 0.39 | La | Ba | Co | 0.78 | 0.1 | 5.5 |

First Evaluation Test

At first, the catalytic converters of Examples 1-1 to 1-10 and Comparative Examples 1-1 to 1-2 were each subjected to a durability test. In this test, each catalytic converter was installed in the exhaust system of an engine having a displacement of 4,400 cubic centimeters (cc). Then, this engine was driven for 50 hr by maintaining the temperature of the inlet of each catalytic converter at 600° C.

Before and after the durability test, the catalytic converters of Examples 1-1 to 1-10 and Comparative Examples 1-1 to 1-2 were each subjected to an evaluation test. In this test, each catalytic converter was installed in the exhaust system of an engine having a displacement of 2,000 cc. Then, this engine was driven at first in a first mode for 60 seconds with an air-fuel ratio of 14.7, then in a second mode for 20 seconds with an air-fuel ratio of 22.0, and then in a third mode for 20 seconds with an air-fuel ratio of 50.0, while the temperature of the inlet of each catalytic converter was maintained at 350° C. The total NOx conversion from the first mode to the third mode was determined by the following expression:

$$\text{The total NOx conversion (\%)} = [(a-b)/a] \times 100$$

where "a" is the total integrated amount of the NOx that was allowed to flow into the inlet of each catalytic converter from the first to third mode for 100 seconds, and "b" is the total integrated amount of the NOx that was exhausted from the outlet of each catalytic converter from the first to third mode for 100 seconds. The results are shown in Table 1-2. Similar to the above, the total HC and CO conversions from the first to third mode were also determined, and the results are shown in Table 1-2.

TABLE 1-2

| | Total Conversion before Durability Test (%) | | | Total Conversion after Durability Test (%) | | |
|---|---|---|---|---|---|---|
| | HC | CO | NOx | HC | CO | NOx |
| Ex. 1-1 | 98 | 99 | 85 | 96 | 98 | 75 |
| Ex. 1-2 | 97 | 99 | 85 | 95 | 98 | 74 |

TABLE 1-2-continued

|  | Total Conversion before Durability Test (%) | | | Total Conversion after Durability Test (%) | | |
| --- | --- | --- | --- | --- | --- | --- |
|  | HC | CO | NOx | HC | CO | NOx |
| Ex. 1-3 | 97 | 99 | 87 | 95 | 98 | 77 |
| Ex. 1-4 | 97 | 99 | 84 | 95 | 98 | 74 |
| Ex. 1-5 | 97 | 99 | 84 | 95 | 98 | 74 |
| Ex. 1-6 | 98 | 99 | 83 | 95 | 98 | 73 |
| Ex. 1-7 | 97 | 99 | 86 | 95 | 98 | 77 |
| Ex. 1-8 | 97 | 99 | 86 | 94 | 98 | 76 |
| Ex. 1-9 | 97 | 99 | 87 | 96 | 98 | 75 |
| Ex. 1-10 | 95 | 99 | 80 | 92 | 98 | 70 |
| Com.Ex.1-1 | 97 | 99 | 75 | 94 | 98 | 62 |
| Com.Ex.1-2 | 96 | 99 | 70 | 94 | 98 | 60 |

The following nonlimitative Examples 2-1 to 2-41 are illustrative of the second preferred embodiment of the present invention.

EXAMPLE 2-1

In this example, there was prepared a device (catalytic converter) for purifying an exhaust gas according to the second preferred embodiment of the invention, which has a first catalyst (downstream catalyst) and a second catalyst (upstream catalyst), as follows.

The upstream catalyst was prepared, as follows. A magnesium acetate aqueous solution was added to an activated alumina. Then, the obtained mixture was dried and then baked at 900° C. for 4 hr, thereby to obtain "powder A", that is, a double oxide of magnesium and alumina. This powder A contained 10.0 wt % of magnesium. It is optional to prepare the powder A by mixing a magnesium acetate aqueous solution with an aluminum nitrate aqueous solution in amounts such that the powder A contains 10.0 wt % of magnesium, then by drying the mixture, and then by baking the mixture at 400° C. for 4 hr. Furthermore, it is optional to prepare the powder A by adding a magnesium acetate aqueous solution to an activated alumina such that the powder A contains 10.0 wt % of magnesium, then by coprecipitating the magnesium ions with the activated alumina using aqueous ammonia, and then by drying the precipitate, followed by baking at 400° C. for 4 hr.

Then, a magnetic ball mill was charged with 900 g of the powder A and 900 g of water. Then, this ball mill was driven for 1 hr to mix and grind these ingredients, thereby to obtain a slurry. Then, this slurry was applied to a cordierite monolithic (honeycomb) substrate having a volume of 1.3 liter and 400 cells. Then, an excessive amount of the slurry on the substrate was blown off by allowing air to flow through the cells. After that, the coated substrate was dried at 130° C. and then baked at 400° C. for 1 hr, thereby to obtain the aimed upstream catalyst having 200 g of a catalytic coating formed on the substrate per liter of the substrate.

Separately, powders B, C and D were prepared in the same manners as those for preparing the powders A, B and C of Example 1-1, respectively. Then, a magnetic ball mill was charged with 347 g of the powder B, 58 g of the powder C, 360 g of the powder D, 136 g of an activated alumina powder, and 900 g of water. Then, the magnetic ball mill was driven for 1 hr to mix and grind these ingredients, thereby to obtain a slurry. Then, this slurry was applied to a cordierite monolithic (honeycomb) substrate having a volume of 1.3 liter and 400 cells. Then, an excessive amount of the slurry on the substrate was blown off by allowing air to flow through the cells. After that, the coated substrate was dried at 130° C. and then baked at 400° C. for 1 hr, thereby to obtain the aimed downstream catalyst having 200 g of a catalytic coating formed on the substrate per liter of the substrate. Then, the aimed catalytic converter was prepared by connecting the upstream and downstream catalysts together.

EXAMPLE 2-2

In this example, Example 2-1 was repeated except in that the magnesium acetate used for preparing the powder A was replaced with a sodium acetate aqueous solution.

EXAMPLE 2-3

In this example, Example 2-1 was repeated except in that the magnesium acetate used for preparing the powder A was replaced with a calcium acetate aqueous solution.

EXAMPLE 2-4

In this example, Example 2-1 was repeated except in that the magnesium acetate used for preparing the powder A was replaced with a strontium acetate aqueous solution.

EXAMPLE 2-5

In this example, Example 2-1 was repeated except in that the magnesium acetate used for preparing the powder A was replaced with a barium acetate aqueous solution.

EXAMPLE 2-6

In this example, Example 2-1 was repeated except in that the magnesium acetate used for preparing the powder A was replaced with an yttrium nitrate aqueous solution.

EXAMPLE 2-7

In this example, Example 2-1 was repeated except in that the magnesium acetate used for preparing the powder A was replaced with a lanthanum nitrate aqueous solution.

EXAMPLE 2-8

In this example, an upstream catalyst was prepared, as follows. A magnesium acetate aqueous solution was mixed with an iron nitrate aqueous solution. The resultant mixture was baked at 900° C. for 4 hr in dry air, thereby to obtain a double oxide of magnesium and iron. Then, this double oxide was loaded on an activated alumina, followed by drying and then baking at 400° C. for 2 hr, thereby to obtain "powder E", that is, an activated alumina powder having a double oxide of magnesium and iron, loaded thereon. This powder E contained 10.0 wt % of magnesium and 5 wt % of iron. Then, a magnetic ball mill was charged with 900 g of the powder E and 900 g of water. Then, this ball mill was driven for 1 hr to mix and grind these ingredients, thereby to obtain a slurry. Then, this slurry was applied to a cordierite monolithic (honeycomb) substrate having a volume of 1.3 liter and 400 cells. Then, an excessive amount of the slurry on the substrate was blown off by allowing air to flow through the cells. After that, the coated substrate was dried at 130° C. and then baked at 400° C. for 1 hr, thereby to obtain the aimed upstream catalyst having 200 g of a catalytic coating formed on the substrate per liter of the substrate. Then, the aimed catalytic converter was prepared by connecting the obtained upstream catalyst with the downstream catalyst obtained in Example 2-1.

EXAMPLE 2-9

In this example, Example 2-8 was repeated except in that the magnesium acetate aqueous solution used for preparing the powder E was replaced with a sodium acetate aqueous solution.

EXAMPLE 2-10

In this example, Example 2-8 was repeated except in that the magnesium acetate aqueous solution used for preparing the powder E was replaced with a calcium acetate aqueous solution.

EXAMPLE 2-11

In this example, Example 2-8 was repeated except in that the magnesium acetate aqueous solution used for preparing the powder E was replaced with a strontium acetate aqueous solution.

EXAMPLE 2-12

In this example, Example 2-8 was repeated except in that the magnesium acetate aqueous solution used for preparing the powder E was replaced with a barium acetate aqueous solution.

EXAMPLE 2-13

In this example, Example 2-8 was repeated except in that the magnesium acetate aqueous solution used for preparing the powder E was replaced with an yttrium nitrate aqueous solution.

EXAMPLE 2-14

In this example, Example 2-8 was repeated except in that the magnesium acetate aqueous solution used for preparing the powder E was replaced with a lanthanum nitrate aqueous solution.

EXAMPLE 2-15

In this example, Example 2-8 was repeated except in that the iron nitrate aqueous solution used for preparing the powder E was replaced with a manganese nitrate aqueous solution.

EXAMPLE 2-16

In this example, Example 2-8 was repeated except in that the iron nitrate aqueous solution used for preparing the powder E was replaced with a cobalt nitrate aqueous solution.

EXAMPLE 2-17

In this example, Example 2-8 was repeated except in that the iron nitrate aqueous solution used for preparing the powder E was replaced with a nickel nitrate aqueous solution.

EXAMPLE 2-18

In this example, an upstream catalyst was prepared, as follows. An iron nitrate aqueous solution was added to the powder A obtained in Example 2-1, followed by drying and then baking at 400° C. for 2 hr, thereby to obtain "powder F". Then, a magnetic ball mill was charged with 900 g of the powder F and 900 g of water. Then, this ball mill was driven for 1 hr to mix and grind these ingredients, thereby to obtain a slurry. Then, this slurry was applied to a cordierite monolithic (honeycomb) substrate having a volume of 1.3 liter and 400 cells. Then, an excessive amount of the slurry on the substrate was blown off by allowing air to flow through the cells. After that, the coated substrate was dried at 130° C. and then baked at 400° C. for 1 hr, thereby to obtain the aimed upstream catalyst having 200 g of a catalytic coating formed on the substrate per liter of the substrate. Then, the aimed catalytic converter was prepared by connecting the obtained upstream catalyst with the downstream catalyst obtained in Example 2-1.

EXAMPLE 2-19

In this example, Example 2-18 was repeated except in that the magnesium acetate aqueous solution used for preparing the powder A was replaced with a sodium acetate aqueous solution.

EXAMPLE 2-20

In this example, Example 2-18 was repeated except in that the magnesium acetate aqueous solution used for preparing the powder A was replaced with a calcium acetate aqueous solution.

EXAMPLE 2-21

In this example, Example 2-18 was repeated except in that the magnesium acetate aqueous solution used for preparing the powder A was replaced with a strontium acetate aqueous solution.

EXAMPLE 2-22

In this example, Example 2-18 was repeated except in that the magnesium acetate aqueous solution used for preparing the powder A was replaced with a barium acetate aqueous solution.

EXAMPLE 2-23

In this example, Example 2-18 was repeated except in that the magnesium acetate aqueous solution used for preparing the powder A was replaced with an yttrium nitrate aqueous solution.

EXAMPLE 2-24

In this example, Example 2-18 was repeated except in that the magnesium acetate aqueous solution used for preparing the powder A was replaced with a lanthanum nitrate aqueous solution.

EXAMPLE 2-25

In this example, Example 2-18 was repeated except in that the iron nitrate aqueous solution used for preparing the powder F was replaced with a manganese nitrate aqueous solution.

EXAMPLE 2-26

In this example, Example 2-18 was repeated except in that the iron nitrate aqueous solution used for preparing the powder F was replaced with a cobalt nitrate aqueous solution.

EXAMPLE 2-27

In this example, Example 2-18 was repeated except in that the iron nitrate aqueous solution used for preparing the powder F was replaced with a nickel nitrate aqueous solution.

EXAMPLE 2-28

An upstream catalyst was prepared, as follows. An iron nitrate aqueous solution was added to an activated alumina.

Then, the mixture was dried and then baked at 900° C. for 4 hr in the air, thereby to obtain a double oxide powder of iron and alumina. Then, a magnesium acetate aqueous solution was added to this powder. Then, the mixture was dried and then baked at 400° C. for 2 hr in the air, thereby to obtain a powder. This powder contained 10.0 wt % of magnesium and 5 wt % of iron. Then, a magnetic ball mill was charged with 900 g of the powder and 900 g of water. Then, this ball mill was driven for 1 hr to mix and grind these ingredients, thereby to obtain a slurry. Then, this slurry was applied to a cordierite monolithic (honeycomb) substrate having a volume of 1.3 liter and 400 cells. Then, an excessive amount of the slurry on the substrate was blown off by allowing air to flow through the cells. After that, the coated substrate was dried at 130° C. and then baked at 400° C. for 1 hr, thereby to obtain the aimed upstream catalyst having 200 g of a catalytic coating formed on the substrate per liter of the substrate. Then, the aimed catalytic converter was prepared by connecting the obtained upstream catalyst with the downstream catalyst obtained in Example 2-1.

EXAMPLE 2-29

An upstream catalyst was prepared, as follows. A magnesium acetate aqueous solution and an iron nitrate aqueous solution were added to an activated alumina. Then, the mixture was dried and then baked at 900° C. for 4 hr in the air, thereby to obtain "powder G", that is, a double oxide powder of magnesium and alumina. This powder G contained 10.0 wt % of magnesium and 5 wt % of iron. It is optional to prepare the powder G by mixing a magnesium acetate aqueous solution with an aluminum nitrate aqueous solution in amounts such that the powder G contains 10.0 wt % of magnesium and 5 wt % of iron, and then by drying the mixture, followed by baking at 400° C. for 4 hr in the air. Furthermore, it is optional to prepare the powder G by adding a magnesium acetate aqueous solution and an iron nitrate aqueous solution to an activated alumina such that the powder G contains 10.0 wt % of magnesium and 5 wt % of iron, then by coprecipitating the magnesium and iron ions with the activated alumina using aqueous ammonia, and then by drying the precipitate, followed by baking at 400° C. for 4 hr.

Then, a magnetic ball mill was charged with 900 g of the powder G and 900 g of water. Then, this ball mill was driven for 1 hr to mix and grind these ingredients, thereby to obtain a slurry. Then, this slurry was applied to a cordierite monolithic (honeycomb) substrate having a volume of 1.3 liter and 400 cells. Then, an excessive amount of the slurry on the substrate was blown off by allowing air to flow through the cells. After that, the coated substrate was dried at 130° C. and then baked at 400° C. for 1 hr, thereby to obtain the aimed upstream catalyst having 200 g of a catalytic coating formed on the substrate per liter of the substrate. Then, the aimed catalytic converter was prepared by connecting the obtained upstream catalyst with the downstream catalyst obtained in Example 2-1.

EXAMPLE 2-30

In this example, Example 2-29 was repeated except in that the magnesium acetate aqueous solution used for preparing the powder G was replaced with a sodium acetate aqueous solution.

EXAMPLE 2-31

In this example, Example 2-29 was repeated except in that the magnesium acetate aqueous solution used for preparing the powder G was replaced with a calcium acetate aqueous solution.

EXAMPLE 2-32

In this example, Example 2-29 was repeated except in that the magnesium acetate aqueous solution used for preparing the powder G was replaced with a strontium acetate aqueous solution.

EXAMPLE 2-33

In this example, Example 2-29 was repeated except in that the magnesium acetate aqueous solution used for preparing the powder G was replaced with a barium acetate aqueous solution.

EXAMPLE 2-34

In this example, Example 2-29 was repeated except in that the magnesium acetate aqueous solution used for preparing the powder G was replaced with an yttrium nitrate aqueous solution.

EXAMPLE 2-35

In this example, Example 2-29 was repeated except in that the magnesium acetate aqueous solution used for preparing the powder G was replaced with a lanthanum nitrate aqueous solution.

EXAMPLE 2-36

In this example, Example 2-29 was repeated except in that the iron nitrate aqueous solution used for preparing the powder G was replaced with a manganese nitrate aqueous solution.

EXAMPLE 2-37

In this example, Example 2-29 was repeated except in that the iron nitrate aqueous solution used for preparing the powder G was replaced with a cobalt nitrate aqueous solution.

EXAMPLE 2-38

In this example, Example 2-29 was repeated except in that the iron nitrate aqueous solution used for preparing the powder G was replaced with a nickel nitrate aqueous solution.

EXAMPLE 2-39

In this example, an upstream catalyst was prepared, as follows. A palladium nitrate aqueous solution was added to the powder G obtained in Example 2-29, followed by drying and then baking at 400° C. for 2 hr, thereby to obtain "powder H". This powder H contained 5 wt % of palladium. Then, a magnetic ball mill was charged with 900 g of the powder H and 900 g of water. Then, this ball mill was driven for 1 hr to mix and grind these ingredients, thereby to obtain a slurry. Then, this slurry was applied to a cordierite monolithic (honeycomb) substrate having a volume of 1.3 liter and 400 cells. Then, an excessive amount of the slurry on the substrate was blown off by allowing air to flow through the cells. After that, the coated substrate was dried at 130° C. and then baked at 400° C. for 1 hr, thereby to obtain the aimed upstream catalyst having 200 g of a catalytic coating formed on the substrate per liter of the substrate. Then, the aimed catalytic converter was prepared by connecting the obtained upstream catalyst with the downstream catalyst obtained in Example 2-1.

EXAMPLE 2-40

In this example, Example 2-39 was repeated except in that the palladium nitrate aqueous solution used for preparing the powder H was replaced with an aqueous solution containing a mixture of palladium nitrate and rhodium nitrate. This aqueous solution contained 5 wt % of the noble metals (Pd:Rh by weight=17:1).

EXAMPLE 2-41

In this example, Example 2-39 was repeated except in that the palladium nitrate aqueous solution used for preparing the powder H was replaced with an aqueous solution containing a mixture of dinitrodiammineplatinum and rhodium nitrate. This aqueous solution contained 5 wt % of the noble metals (Pt:Rh by weight=17:1).

COMPARATIVE EXAMPLE 2-1

In this comparative example, Example 2-1 was repeated except in that the upstream catalyst was omitted.

COMPARATIVE EXAMPLE 2-2

In this comparative example, a downstream catalyst was prepared, as follows. A dinitrodiammineplatinum aqueous solution was added to an activated alumina. Then, the mixture was dried and then baked at 400° C. for 1 hr in the air, thereby to obtain an activated alumina powder having platinum loaded thereon. This powder contained 5.0 wt % of platinum. Then, a magnetic ball mill was charged with 900 g of the powder and 900 g of water. Then, this ball mill was driven for 1 hr to mix and grind these ingredients, thereby to obtain a slurry. Then, this slurry was applied to a cordierite monolithic (honeycomb) substrate having a volume of 1.3 liter and 400 cells. Then, an excessive amount of the slurry on the substrate was blown off by allowing air to flow through the cells. After that, the coated substrate was dried at 130° C. and then baked at 400° C. for 1 hr, thereby to obtain a downstream catalyst having 200 g of a catalytic coating formed on the substrate per liter of the substrate. Then, the downstream catalyst was immersed in a barium acetate aqueous solution, thereby to have barium thereon in an amount of 30 g in the form of barium oxide per liter of the substrate. Then, the aimed catalytic converter was prepared by connecting the upstream catalyst obtained in Example 2-1 with the obtained downstream catalyst.

COMPARATIVE EXAMPLE 2-3

In this comparative example, an upstream catalyst was prepared, as follows. A magnesium acetate aqueous solution was added to an activated alumina. Then, the mixture was dried and then baked at 400° C. for 1 hr in the air, thereby to obtain an activated alumina powder having magnesium loaded thereon. This powder contained 10.0 wt % of magnesium. Then, a magnetic ball mill was charged with 900 g of the powder and 900 g of water. Then, this ball mill was driven for 1 hr to mix and grind these ingredients, thereby to obtain a slurry. Then, this slurry was applied to a cordierite monolithic (honeycomb) substrate having a volume of 1.3 liter and 400 cells. Then, an excessive amount of the slurry on the substrate was blown off by allowing air to flow through the cells. After that, the coated substrate was dried at 130° C. and then baked at 400° C. for 1 hr, thereby to obtain an upstream catalyst having 200 g of a catalytic coating formed on the substrate per liter of the substrate. Then, the aimed catalytic converter was prepared by connecting the obtained upstream catalyst with the downstream catalyst obtained in Example 2-1.

SECOND EVALUATION TEST

At first, the catalytic converters of Examples 2-1 to 2-41 and Comparative Examples 2-1 to 2-3 were each subjected to a durability test. In this test, each catalytic converter was installed in the exhaust system of an engine having a displacement of 4,400 cubic centimeters (cc). Then, this engine was driven for 50 hr by maintaining the temperature of the inlet of the upstream catalyst at 650° C. and then for 5 hr by maintaining the same at 350° C. Upon this, a gasoline containing 300 ppm of sulfur was used for driving the engine.

Before and after the durability test, the catalytic converters of Examples 2-1 to 2-41 and Comparative Examples 2-1 to 2-3 were each subjected to an evaluation test. In this test, each catalytic converter was installed in the exhaust system of an engine having a displacement of 2,000 cc. Then, this engine was driven by using a gasoline containing 300 ppm of sulfur at first in a first mode for 20 seconds with an air-fuel ratio of 14.7, then in a second mode for 30 seconds with an air-fuel ratio of 22.0, and then in a third mode for 30 seconds with an air-fuel ratio of 50.0. The total NOx conversion from the first to third mode was determined in the same manner as that of the First Evaluation Test, and the results are shown in Table 2-1. Similar to the above, the total HC and CO conversions from the first to third mode were determined, and the results are also shown in Table 2-1.

It is understood from Table 2-1 that the total NOx conversion of Comparative Example 2-1 is inferior to that of Example 2-1. The reason of this will be discussed in the following. In case of the catalytic converter according to Comparative Example 2-1, in which the upstream catalyst was omitted, sulfur oxides of the exhaust gas are directly introduced into the downstream catalyst (i.e., NOx-absorbing catalyst). With this, it is assumed that the sulfur oxides are trapped by the downstream catalyst and hardly desorbed therefrom. This may reduce the NOx absorption capability of the downstream catalyst. Furthermore, it is understood from Table 2-1 that the total NOx conversion of Comparative Example 2-2 is inferior to that of Example 2-1. The reason of this will be discussed in the following. In case of the catalytic converter according to Comparative Example 2-2, in which the downstream catalyst is not in accordance with the second preferred embodiment of the invention, sulfur oxide desorbed from the upstream catalyst under the stoichiometric condition are introduced into the downstream catalyst and then turn into sulfate at the downstream catalyst. It is assumed that this sulfate is bonded with the NOx absorbent of the downstream catalyst and is not easily desorbed therefrom. This may reduce the NOx absorption capability of the downstream catalyst. In contrast, according to Example 2-1, it may be possible to prevent the absorption of sulfur oxide, which has been desorbed from the upstream catalyst under the stoichiometric or fuel-rich condition, into the downstream catalyst. Furthermore, it is understood from Table 2-1 that the total NOx conversion of Comparative Example 2-3 is inferior to that of Example 2-1. The reason of this will be discussed in the following. In case of the catalytic converter according to Comparative Example 2-3, it is assumed that a double oxide of magnesium and alumina is not formed in the upstream catalyst. This may have reduced the total NOx conversion. In contrast, according to Example 2-1, a double oxide of magnesium and alumina is formed in the upstream catalyst. This may improve the capability to desorb sulfur oxides and thus may increase the total NOx conversion.

TABLE 2-1

|  | Total Conversion before Durability Test(%) | | | Total Conversion after Durability Test (%) | | |
| --- | --- | --- | --- | --- | --- | --- |
|  | HC | CO | NOx | HC | CO | NOx |
| Ex. 2-1 | 98 | 99 | 83 | 96 | 98 | 72 |
| Ex. 2-2 | 97 | 99 | 81 | 95 | 97 | 71 |
| Ex. 2-3 | 97 | 99 | 83 | 95 | 98 | 71 |
| Ex. 2-4 | 97 | 99 | 82 | 95 | 97 | 72 |
| Ex. 2-5 | 98 | 99 | 80 | 95 | 98 | 70 |
| Ex. 2-6 | 97 | 99 | 81 | 95 | 98 | 70 |
| Ex. 2-7 | 97 | 99 | 82 | 96 | 98 | 71 |
| Ex. 2-8 | 97 | 99 | 88 | 95 | 98 | 77 |
| Ex. 2-9 | 98 | 99 | 86 | 95 | 98 | 76 |
| Ex. 2-10 | 98 | 99 | 86 | 96 | 97 | 76 |
| Ex. 2-11 | 96 | 99 | 85 | 94 | 98 | 76 |
| Ex. 2-12 | 97 | 99 | 83 | 94 | 98 | 75 |
| Ex. 2-13 | 97 | 99 | 86 | 95 | 98 | 76 |
| Ex. 2-14 | 98 | 99 | 84 | 95 | 98 | 76 |
| Ex. 2-15 | 98 | 99 | 87 | 94 | 98 | 77 |
| Ex. 2-16 | 97 | 99 | 87 | 95 | 97 | 76 |
| Ex. 2-17 | 97 | 99 | 87 | 94 | 97 | 76 |
| Ex. 2-18 | 98 | 99 | 88 | 96 | 98 | 78 |
| Ex. 2-19 | 98 | 99 | 87 | 96 | 97 | 77 |
| Ex. 2-20 | 97 | 99 | 86 | 96 | 97 | 76 |
| Ex. 2-21 | 97 | 99 | 86 | 95 | 98 | 77 |
| Ex. 2-22 | 98 | 99 | 86 | 95 | 98 | 76 |
| Ex. 2-23 | 98 | 99 | 87 | 96 | 97 | 78 |
| Ex. 2-24 | 97 | 99 | 85 | 95 | 98 | 76 |
| Ex. 2-25 | 98 | 99 | 87 | 96 | 97 | 77 |
| Ex. 2-26 | 98 | 99 | 88 | 95 | 98 | 76 |
| Ex. 2-27 | 98 | 99 | 87 | 95 | 97 | 78 |
| Ex. 2-28 | 97 | 99 | 88 | 96 | 97 | 77 |
| Ex. 2-29 | 98 | 99 | 89 | 97 | 98 | 78 |
| Ex. 2-30 | 97 | 99 | 87 | 96 | 97 | 77 |
| Ex. 2-31 | 98 | 99 | 87 | 96 | 97 | 78 |
| Ex. 2-32 | 98 | 99 | 86 | 95 | 98 | 76 |
| Ex. 2-33 | 98 | 99 | 87 | 96 | 98 | 77 |
| Ex. 2-34 | 97 | 99 | 87 | 97 | 98 | 78 |
| Ex. 2-35 | 98 | 99 | 87 | 95 | 98 | 77 |
| Ex. 2-36 | 98 | 99 | 88 | 96 | 97 | 78 |
| Ex. 2-37 | 98 | 99 | 88 | 96 | 98 | 76 |
| Ex. 2-38 | 97 | 99 | 88 | 95 | 98 | 78 |
| Ex. 2-39 | 98 | 99 | 89 | 97 | 98 | 78 |
| Ex. 2-40 | 98 | 99 | 89 | 96 | 97 | 78 |
| Ex. 2-41 | 98 | 99 | 90 | 97 | 98 | 81 |
| Com.Ex. 2-1 | 96 | 99 | 65 | 94 | 98 | 52 |
| Com.Ex. 2-2 | 95 | 99 | 58 | 92 | 98 | 47 |
| Com.Ex. 2-3 | 97 | 99 | 70 | 95 | 98 | 60 |

The following nonlimitative Examples 3-1 to 3-22 are illustrative of the third preferred embodiment of the present invention.

EXAMPLE 3-1

In this example, there was prepared a device (catalytic converter) for purifying an exhaust gas according to the third preferred embodiment of the present invention, which has a multilayered catalytic coating, as follows.

A base layer of the multilayered catalytic coating was formed, as follows. A barium acetate aqueous solution was added to an activated alumina. Then, the obtained mixture was dried and then baked or calcined at 400° C. for 1 hr in the air, thereby to prepare "powder A", that is, an alumina powder having barium loaded thereon. This powder A contained 20.0 wt % of barium. Then, a palladium nitrate aqueous solution was added to the powder A. Then, the obtained mixture was dried and then baked at 400° C. for 1 hr in the air, thereby to prepare "powder B", that is, an alumina powder supporting thereon barium and palladium. This powder B contained 5.0 wt % of palladium, as shown in Table 3-1. Then, a rhodium nitrate aqueous solution was added to the powder A. Then, the obtained mixture was dried and then baked at 400° C. for 1 hr in the air, thereby to prepare "powder C", that is, an activated alumina powder supporting thereon barium, palladium and rhodium. This powder C contained 2.0 wt % of rhodium, as shown in Table 3-1. Then, a magnetic ball mill was charged with 522 g of the powder B, 135 g of powder C, 243 g of an activated alumina powder, and 900 g of water. Then, this ball mill was driven for 1 hr to mix and grind these ingredients, thereby to obtain a slurry. The particles of the slurry had an average particle diameter of 5 μm. Then, this slurry was applied to a cordierite monolithic (honeycomb) substrate having a volume of 1.3 liter and 400 cells. Then, an excessive amount of the slurry on the substrate was blown off by allowing air to flow through the cells. After that, the coated substrate was dried at 130° C. and then baked at 400° C. for 1 hr, thereby to form on the substrate 200 g of a base layer per liter of the substrate.

Separately, a magnesium acetate aqueous solution was added to an activated alumina. Then, the obtained mixture was dried and then baked at 400° C. for 1 hr in the air, thereby to prepare "powder D", that is, an alumina powder having magnesium loaded thereon. This powder D contained 10.0 wt % of magnesium, as shown in Table 3-1. Then, a palladium nitrate aqueous solution was added to the powder D. Then, the obtained mixture was dried and then baked at 400° C. for 1 hr in the air, thereby to prepare "powder E". This powder E contained 5 wt % of palladium, as shown in Table 3-1. Then, a magnetic ball mill was charged with 763 g of the powder E, 137 g of an activated alumina powder, and 900 g of water. Then, this ball mill was driven for 1 hr to mix and grind these ingredients, thereby to obtain a slurry. The particles of the slurry had an average particle diameter of 5 μm. Then, this slurry was applied to the coated substrate having the base layer formed on the substrate. Then, an excessive amount of the slurry on the base layer was blown off by allowing air to flow through the cells. After that, the coated substrate was dried at 130° C. and then baked at 400° C. for 1 hr, thereby to obtain the aimed catalytic converter having 100 g of a surface layer per liter of the substrate, on the base layer. Table 3-1 shows the chemical compositions of the base layer and the surface layer, except the activated alumina. It should be noted that the weight percent of each element (e.g., barium) in Table 3-1 is based on the total weight of each preparatory powder (e.g., the powder A), as mentioned above. The values of Gibbs energy of reaction of sulfates of the respective elements at 400° C. are shown in Table 3-1.

EXAMPLE 3-2

In this example, Example 3-1 was repeated except in that the magnesium acetate aqueous solution used for preparing the powder D was replaced with a calcium nitrate aqueous solution.

EXAMPLE 3-3

In this example, Example 3-1 was repeated except in that the magnesium acetate aqueous solution used for preparing the powder D was replaced with an iron nitrate aqueous solution.

EXAMPLE 3-4

In this example, Example 3-1 was repeated except in that the magnesium acetate aqueous solution used for preparing the powder D was replaced with a cobalt acetate aqueous solution.

EXAMPLE 3-5

In this example, Example 3-1 was repeated except in that the magnesium acetate aqueous solution used for preparing the powder D was replaced with a lanthanum nitrate aqueous solution.

EXAMPLE 3-6

In this example, Example 3-1 was repeated except in that the barium acetate aqueous solution used for preparing the powder A was replaced with a cesium carbonate aqueous solution.

EXAMPLE 3-7

In this example, Example 3-1 was repeated except in that the barium acetate aqueous solution used for preparing the powder A was replaced with a sodium carbonate aqueous solution.

EXAMPLE 3-8

In this example, Example 3-1 was repeated except in that the barium acetate aqueous solution used for preparing the powder A was replaced with a potassium carbonate aqueous solution.

EXAMPLE 3-9

In this example, Example 3-1 was repeated except in that the manner of the formation of the surface layer on the base layer was modified as follows. A rhodium nitrate aqueous solution was added to the powder D of Example 3-1. Then, the obtained mixture was dried and then baked or calcined at 400° C. for 1 hr in the air, thereby to prepare "powder F", that is, an alumina powder supporting thereon rhodium and magnesium. This powder F contained 2.0 wt % of rhodium. Then, a magnetic ball mill was charged with 693 g of the powder E of Example 3-1, 174 g of the powder F, 33 g of an activated alumina powder, and 900 g of water. Then, this ball mill was driven to mix and grind these ingredients, thereby to obtain a slurry. The particles of the slurry had an average particle diameter of 5 µm. Then, this slurry was applied to the coated substrate having the base layer formed on the substrate in accordance with Example 3-1. Then, an excessive amount of the slurry on the base layer was blown off by allowing air to flow through the cells. After that, the coated substrate was dried at 130° C. and then baked at 400° C. for 1 hr, thereby to obtain the aimed catalytic converter having 100 g of a surface layer per liter of the substrate, on the base layer.

EXAMPLE 3-10

In this example, Example 3-1 was repeated except in that the manner of the formation of the surface layer on the base layer was modified as follows. A dinitrodiammine-platinum aqueous solution was added to the powder D of Example 3-1. Then, the obtained mixture was dried and then baked or calcined at 400° C. for 1 hr in the air, thereby to prepare "powder G", that is, an alumina powder supporting thereon platinum and magnesium. This powder G contained 5.0 wt % of platinum. Then, a magnetic ball mill was charged with 436 g of the powder G, 180 g of the powder F of Example 3-9, 284 g of an activated alumina powder, and 900 g of water. Then, this ball mill was driven to mix and grind these ingredients, thereby to obtain a slurry. The particles of the slurry had an average particle diameter of 5 µm. Then, this slurry was applied to the coated substrate having the base layer formed on the substrate in accordance with Example 3-1. Then, an excessive amount of the slurry on the base layer was blown off by allowing air to flow through the cells. After that, the coated substrate was dried at 130° C. and then baked at 400° C. for 1 hr, thereby to obtain the aimed catalytic converter having 100 g of a surface layer per liter of the substrate, on the base layer.

EXAMPLE 3-11

In this example, Example 3-1 was repeated except in that the manner of the formation of the base layer on the substrate was modified as follows. A dinitrodiammine-platinum aqueous solution was added to the powder A of Example 3-1. Then, the obtained mixture was dried and then baked at 400° C. for 1 hr in the air, thereby to prepare "powder H", that is, an alumina powder supporting thereon platinum and barium. This powder H contained 5.0 wt % of platinum. Then, a magnetic ball mill was charged with 382 g of the powder H, 160 g of the powder C of Example 3-1, 358 g of an activated alumina powder, and 900 g of water. Then, this ball mill was driven for 1 hr to mix and grind these ingredients, thereby to obtain a slurry. The particles of the slurry had an average particle diameter of 5 µm. Then, this slurry was applied to a cordierite monolithic (honeycomb) substrate having a volume of 1.3 liter and 400 cells. Then, an excessive amount of the slurry on the substrate was blown off by allowing air to flow through the cells. After that, the coated substrate was dried at 130° C. and then baked at 400° C. for 1 hr, thereby to form on the substrate 200 g of a base layer per liter of the substrate. Then, a surface layer was formed on the base layer in the same manner as that of Example 3-1.

EXAMPLE 3-12

In this example, Example 3-1 was repeated except in that the manner of the formation of the base layer on the substrate was modified as follows. A palladium nitrate aqueous solution was added to an activated alumina powder. Then, the obtained mixture was dried and then baked at 400° C. for 1 hr in the air, thereby to prepare "powder I", that is, an alumina powder supporting thereon palladium. This powder I contained 6.0 wt % of palladium. Separately, a rhodium nitrate aqueous solution was added to an activated alumina powder. Then, the obtained mixture was dried and then baked at 400° C. for 1 hr in the air, thereby to prepare "powder J", that is, an alumina powder supporting thereon rhodium. This powder J contained 3.0 wt % of rhodium. Separately, citric acid was added to a mixture of lanthanum carbonate, barium carbonate and cobalt carbonate. Then, the obtained mixture was dried and then baked at 700° C. to prepare "powder K". This powder K contained 2 parts by the number of atoms of La, 7 of Ba and 10 of Co. Thus, the composition of the powder K (double oxide) was $La_{0.2}Ba_{0.7}CoO_x$, where X is a number greater than 0, as shown in Table 3-1. Then, a magnetic ball mill was charged with 435 g of the powder I, 90 g of the powder J, 15 g of an activated alumina powder, and 900 g of water. Then, this ball mill was driven for 1 hr to mix and grind these ingredients, thereby to obtain a slurry. The particles of the slurry had an average particle diameter of 5 µm. Then, this slurry was applied to a cordierite monolithic (honeycomb) substrate having a volume of 1.3 liter and 400 cells. Then, an excessive amount of the slurry on the substrate was blown off by allowing air to flow through the cells. After that, the coated substrate was dried at 130° C. and then baked at 400° C. for 1 hr, thereby to form on the substrate 200 g of a base layer per liter of the substrate. Then, a surface layer was formed on the base layer in the same manner as that of Example 3-1.

EXAMPLE 3-13

In this example, Example 3-1 was repeated except in that an interlayer was additionally formed between the base layer and the surface layer, as follows. A magnetic ball mill was charged with 810 g of a MFI zeolite powder, 90 g of an activated alumina powder, and 900 g of water. Then, this ball mill was driven for 1 hr to mix and grind these ingredients, thereby to obtain a slurry. Then, this slurry was applied to the coated substrate having the base layer formed on the substrate. Then, an excessive amount of the slurry on the substrate was blown off by allowing air to flow through the cells. After that, the coated substrate was dried at 130° C. and then baked at 400° C. for 1 hr, thereby to form on the base layer 50 g of a zeolite layer (interlayer) per liter of the substrate. Then, a surface layer was formed on the interlayer in the same manner as that of Example 3-1.

EXAMPLE 3-14

In this example, Example 3-13 was repeated except in that the MFI zeolite powder was replaced with a $TiO_2$ powder.

EXAMPLE 3-15

In this example, Example 3-13 was repeated except in that the MFI zeolite powder was replaced with a $SiO_2$ powder.

EXAMPLE 3-16

In this example, Example 3-13 was repeated except in that the MFI zeolite powder was replaced with a $ZrO_2$ powder.

EXAMPLE 3-17

In this example, Example 3-1 was repeated except in that each slurry for preparing the base layer and the surface layer was subjected to a grinding with a magnetic ball mill for 2 hr, in place of 1 hr. With this, the particles of each slurry had an average particle diameter of 4 μm.

EXAMPLE 3-18

In this example, Example 3-12 was repeated except in that each slurry for preparing the base layer and the surface layer was subjected to a grinding with a magnetic ball mill for 2 hr, in place of 1 hr. With this, the particles of each slurry had an average particle diameter of 4 μm.

EXAMPLE 3-19

In this example, Example 3-1 was repeated except in that the weight of the base layer per liter of the substrate was changed from 200 g to 225 g and that the weight of the surface layer per liter of the substrate was changed from 100 g to 75 g.

EXAMPLE 3-20

In this example, Example 3-1 was repeated except in that the weight of the base layer per liter of the substrate was changed from 200 g to 150 g and that the weight of the surface layer per liter of the substrate was changed from 100 g to 150 g.

EXAMPLE 3-21

In this example, Example 3-1 was repeated except in that the weight of the base layer per liter of the substrate was changed from 200 g to 100 g and that the weight of the surface layer per liter of the substrate was changed from 100 g to 200 g.

EXAMPLE 3-22

In this example, Example 3-1 was repeated except in that the weight of the base layer per liter of the substrate was changed from 200 g to 75 g and that the weight of the surface layer per liter of the substrate was changed from 100 g to 225 g.

COMPARATIVE EXAMPLE 3-1

In this example, Example 3-1 was repeated except in that the formation of the surface layer was omitted.

COMPARATIVE EXAMPLE 3-2

In this comparative example, Example 3-1 was repeated except in that the manner of the formation of the surface layer on the base layer was modified as follows. A palladium nitrate aqueous solution was added to an activated alumina powder. Then, the obtained mixture was dried and then baked at 400° C. for 1 hr in the air, thereby to prepare "powder P", that is, an alumina powder supporting thereon palladium. This powder P contained 5.0 wt % of palladium. Then, a magnetic ball mill was charged with 763 g of the powder P, 237 g of an activated alumina powder, and 900 g of water. Then, this ball mill was driven for 1 hr to mix and grind these ingredients, thereby to obtain a slurry. The particles of the slurry had an average particle diameter of 5 μm. Then, this slurry was applied to the coated substrate having the base layer formed on the substrate. Then, an excessive amount of the slurry on the base layer was blown off by allowing air to flow through the cells. After that, the coated substrate was dried at 130° C. and then baked at 400° C. for 1 hr, thereby to obtain a catalytic converter having 100 g of a surface layer per liter of the substrate, on the base layer.

COMPARATIVE EXAMPLE 3-3

In this example, Example 3-1 was repeated except in that the weight of the base layer per liter of the substrate was changed from 200 g to 60 g and that the weight of the surface layer per liter of the substrate was changed from 100 g to 240 g.

COMPARATIVE EXAMPLE 3-4

In this example, Example 3-1 was repeated except in that the weight of the base layer per liter of the substrate was changed from 200 g to 240 g and that the weight of the surface layer per liter of the substrate was changed from 100 g to 60 g.

TABLE 3-1

| Chemical Composition (wt %) | | Noble Metals | | | Alkali Metals | | | Alkali Earth Metals Elements | | | Rare Earth Element | Transition Metals | | Other Additives |
|---|---|---|---|---|---|---|---|---|---|---|---|---|---|---|
| | | Pd | Rh | Pt | Na | K | Cs | Mg | Ca | Ba | La | Fe | Co | |
| | | | | | | | | ΔG (kJ/mol) | | | | | | |
| | | | | | −496.2 | −598.3 | −610.3 | −195.4 | −324.3 | −435.1 | −214.3 | −86.35 | −140.3 | |
| Ex. 3.1 | Base Layer | 5 | 2 | | | | | | | 20 | | | | |
| | Surface Layer | 5 | | | | | | 10 | | | | | | |
| Ex. 3-2 | Base Layer | 5 | 2 | | | | | | | 20 | | | | |
| | Surface Layer | 5 | | | | | | | 10 | | | | | |
| Ex. 3-3 | Base Layer | 5 | 2 | | | | | | | 20 | | | | |
| | Surface Layer | 5 | | | | | | | | | | 10 | | |
| Ex. 3-4 | Base Layer | 5 | 2 | | | | | | | 20 | | | | |
| | Surface Layer | 5 | | | | | | | | | | | 10 | |
| Ex. 3-5 | Base Layer | 5 | 2 | | | | | | | 20 | | | | |
| | Surface Layer | 5 | | | | | | | | | 10 | | | |
| Ex. 3-6 | BaseLayer | 5 | 2 | | | | 20 | | | | | | | |
| | Surface Layer | 5 | | | | | | 10 | | | | | | |
| Ex. 3-7 | Base Layer | 5 | 2 | | 20 | | | | | | | | | |
| | Surface Layer | 5 | | | | | | 10 | | | | | | |
| Ex. 3-8 | Base Layer | 5 | 2 | | | 20 | | | | | | | | |
| | Surface Layer | 5 | | | | | | 10 | | | | | | |
| Ex. 3-9 | Base Layer | 5 | 2 | | | | | | | 20 | | | | |
| | Surface Layer | 5 | 2 | | | | | 10 | | | | | | |
| Ex. 3-10 | Base Layer | 5 | 2 | | | | | | | 20 | | | | |
| | Surface Layer | | 2 | 5 | | | | 10 | | | | | | |
| Ex. 3-11 | Baae Layer | | 2 | 5 | | | | | | 20 | | | | |
| | Surface Layer | 5 | | | | | | 10 | | | | | | |
| Ex. 3.12 | Base Layer | 5 | 2 | | | | | | | | | | | $La_{0.2}Ba_{0.7}CoOx$ |
| | Surface Layer | 5 | | | | | | 10 | | | | | | |
| Ex. 3-13 | Base Layer | 5 | 2 | | | | | | | 20 | | | | MFI Zeolite |
| | Surface Layer | 5 | | | | | | 10 | | | | | | |
| Ex. 3-14 | Base Layer | 5 | 2 | | | | | | | 20 | | | | $TiO_2$ |
| | Surface Layer | 5 | | | | | | 10 | | | | | | |
| Ex. 3-15 | Base Layer | 5 | 2 | | | | | | | 20 | | | | $SiO_2$ |
| | Surface Layer | 5 | | | | | | 10 | | | | | | |
| Ex. 3-16 | Base Layer | 5 | 2 | | | | | | | 20 | | | | $ZrO_2$ |
| | Surface Layer | 5 | | | | | | 10 | | | | | | |
| Ex. 3-17 | Base Layer | 5 | 2 | | | | | | | 20 | | | | |
| | Surface Layer | 5 | | | | | | 10 | | | | | | |
| Ex. 3-18 | Base Layer | 5 | 2 | | | | | | | 20 | | | | $La_{0.2}Ba_{0.7}CoOx$ |
| | Surface Layer | 5 | | | | | | 10 | | | | | | |
| Ex. 3-19 | Base Layer | 5 | 2 | | | | | | | 20 | | | | |
| | Surface Layer | 5 | | | | | | 10 | | | | | | |
| Ex. 3-20 | Bsse Layer | 5 | 2 | | | | | | | | | 20 | | |
| | Surface Layer | 5 | | | | | | 10 | | | | | | |
| Ex. 3-21 | Base Layer | 5 | 2 | | | | | | | 20 | | | | |
| | Surface Layer | 5 | | | | | | 10 | | | | | | |
| Ex. 3-22 | Base Layer | 5 | 2 | | | | | | | 20 | | | | |
| | Surface Layer | 5 | | | | | | 10 | | | | | | |
| Com. Ex. 3-1 | Base Layer | 5 | 2 | | | | | | | 20 | | | | |
| Com. Ex. 3-2 | Bsse Layer | | 2 | | | | | | | 20 | | | | |
| | Surface Layer | 5 | | | | | | | | | | | | |
| Com. Ex. 3-2 | Base Layer | 5 | 2 | | | | | | | 20 | | | | |
| | Surface Layer | 5 | | | | | | 10 | | | | | | |
| Com. Ex. 3-2 | Base Layer | 5 | 2 | | | | | | | 20 | | | | |
| | Surface Layer | 5 | | | | | | 10 | | | | | | |

Third Evaluation Test

At first, the catalytic converters of Examples 3-1 to 3-22 and Comparative Examples 3-1 to 3-4 were each subjected to a durability test. In this test, each catalytic converter was installed in the exhaust system of an engine having a displacement of 4,400 cubic centimeters (cc). Then, this engine was driven for 50 hr by maintaining the temperature of the inlet of the catalytic converter at 650° C. After this durability test, each catalytic converter was installed in the exhaust system of an engine having a displacement of 2,000 cc. Then, this engine was driven in an evaluation test by repeating 100 cycles of an EC+EUDC mode. In this mode, there was a range or region where the temperature of the inlet of the catalytic converter was 500° C. for 30 seconds. The total HC, CO and NOx conversions of the $1^{st}$ and $100^{th}$ cycles were determined, and the results are shown in Table 3-2. The decrease of the total NOx conversion by percentage shown in Table 3-2 was determined by the expression $(A-B) \div A \times 100$ where A is the total NOx conversion of the $1^{st}$ cycle and B is that of the $100^{th}$ cycle.

It is understood from Table 3-2 that the decrease of the total NOx conversion according to each of Examples 3-1 to 3-22 is much smaller than that according to each of Comparative Examples 3-1 to 3-2. In connection with this, it is assumed that, according to Examples 3-1 to 3-22, the decrease of the total NOx conversion caused by sulfur was substantially suppressed by forming the surface layer according to the third preferred embodiment of the invention on the base layer (NOx absorbing catalyst), in contrast with Comparative Examples 3-1 to 3-2. In other words, it may become possible to substantially prevent the direct contact of sulfur oxides with the base layer by the provision of the surface layer of the invention. Furthermore, it is assumed that the decrease of the total NOx conversion caused by sulfur can very effectively be suppressed by containing, for example, magnesium as a sulfur absorbing component (the second element) in the surface layer, as shown by the result of Example 3-1. In other words, it may become possible to decrease the amount of sulfur oxides flowing into the base layer by containing the sulfur absorbing component in the surface layer. As mentioned above, the temperature of the inlet of the catalytic converter was maintained at 500° C. for 30 seconds in one cycle of the above mode. With this temperature, it may become possible to desorb sulfur oxides which have been absorbed in the form of sulfates into the surface layer. This desorption may contribute to the suppression of the decrease of the NOx conversion. It may become possible to increase the capability to desorb sulfur oxides by containing a particular double oxide, which is used in Examples 3-12 and 3-18, in the base layer. It may become possible to prevent the direct contact of sulfur oxides with the base layer (NOx absorbing catalyst) by the provision of an acid interlayer as shown in Examples 3-13 to 3-16. This may also contribute to the suppression of the decrease of the NOx conversion. It may become possible to increase the NOx conversion, prior to the deterioration of the base layer caused by sulfur, by adjusting the average particle diameter of the particles of each slurry for preparing the base and surface layers to 4 μm, which is shown in Examples 3-17 and 3-18, or to less than 4μm. teachings. The scope of the invention is defined with reference to the following claims.

TABLE 3-2

| Surface Layer/Base Layer by Wt. | Total Conversion of $1^{st}$ Cycle (%) | | | Total Conversion of $100^{th}$ Cycle (%) | | | Decrease of Total NOx Conversion (%) |
|---|---|---|---|---|---|---|---|
| | HC | CO | NOx | HC | CO | NOx | |
| Ex. 3-1 | 1/2 | 95 | 98 | 71 | 95 | 98 | 60 | 15.5 |
| Ex. 3-2 | 1/2 | 95 | 98 | 70 | 96 | 97 | 59 | 15.7 |
| Ex. 3-3 | 1/2 | 96 | 98 | 70 | 96 | 97 | 60 | 14.3 |
| Ex. 3-4 | 1/2 | 95 | 98 | 72 | 94 | 98 | 60 | 16.7 |
| Ex. 3-5 | 1/2 | 96 | 98 | 71 | 96 | 98 | 59 | 16.9 |
| Ex. 3-6 | 1/2 | 96 | 98 | 70 | 95 | 98 | 58 | 17.1 |
| Ex. 3-7 | 1/2 | 95 | 98 | 70 | 96 | 97 | 61 | 12.9 |
| Ex. 3-8 | 1/2 | 96 | 98 | 71 | 96 | 98 | 60 | 15.5 |
| Ex. 3-9 | 1/2 | 95 | 98 | 71 | 94 | 97 | 60 | 15.5 |
| Ex. 3-10 | 1/2 | 95 | 98 | 70 | 95 | 98 | 58 | 17.1 |
| Ex. 3-11 | 1/2 | 95 | 98 | 71 | 95 | 98 | 59 | 16.9 |
| Ex. 3-12 | 1/2 | 96 | 98 | 72 | 95 | 97 | 62 | 13.9 |
| Ex. 3-13 | 1/2 | 96 | 98 | 69 | 96 | 99 | 65 | 5.80 |
| Ex. 3-14 | 1/2 | 95 | 98 | 68 | 96 | 98 | 65 | 4.41 |
| Ex. 3-15 | 1/2 | 95 | 98 | 68 | 95 | 98 | 66 | 2.94 |
| Ex. 3-16 | 1/2 | 95 | 98 | 69 | 96 | 97 | 67 | 2.90 |
| Ex. 3-17 | 1/2 | 95 | 98 | 78 | 95 | 98 | 75 | 3.85 |
| Ex. 3-18 | 1/2 | 96 | 98 | 75 | 95 | 97 | 74 | 1.33 |
| Ex. 3-19 | 1/3 | 95 | 97 | 78 | 94 | 98 | 65 | 16.7 |
| Ex. 3-20 | 1/1 | 96 | 98 | 70 | 96 | 98 | 59 | 15.7 |
| Ex. 3-21 | 2/1 | 95 | 98 | 65 | 94 | 98 | 55 | 15.4 |
| Ex. 3-22 | 3/1 | 95 | 97 | 55 | 95 | 98 | 48 | 12.7 |
| Com. Ex. 3-1 | — | 94 | 97 | 70 | 93 | 96 | 35 | 50.0 |
| Com. Ex. 3-2 | 1/2 | 96 | 98 | 70 | 96 | 97 | 42 | 40.0 |

TABLE 3-2-continued

| Surface Layer/Base Layer by Wt. | Total Conversion of $1^{st}$ Cycle (%) | | | Total Conversion of $100^{th}$ Cycle (%) | | | Decrease of Total NOx Conversion (%) |
|---|---|---|---|---|---|---|---|
| | HC | CO | NOx | HC | CO | NOx | |
| Ex. 3-2 Com. Ex. 3-3 | 4/1 | 95 | 98 | 80 | 94 | 98 | 40 | 50.0 |
| Com. Ex. 3-4 | 1/4 | 95 | 97 | 50 | 95 | 98 | 40 | 20.0 |

The entire contents of Japanese Patent Applications P10-56530 (filed Mar. 9, 1998), P10-215343 (filed Jul. 30, 1998) and P10-224151 (filed Aug. 7, 1998) are incorporated herein by reference.

Although the invention has been described above by reference to certain embodiments of the invention, the invention is not limited to the embodiments described above. Modifications and variations of the embodiments described above will occur to those skilled in the art, in light of the above

What is claimed is:

1. A catalyst system for purifying an exhaust gas, said catalyst system comprising a first catalyst for purifying a NOx of the exhaust gas, said first catalyst comprising:

a first powder comprising a porous carrier and a noble metal loaded on said porous carrier, said noble metal being selected from the group consisting of platinum, palladium and rhodium; and a second powder comprising a first double oxide represented by the following general formula (1):

$$(Ln_{1-\alpha}A_\alpha)_{1-\beta}BO_\delta \tag{1}$$

where α is a number that is greater than 0 and less than 1, β is a number that is greater than 0 and less than 1, δ is a number that is greater than 0, Ln is a first element selected from the group consisting of La, Ce, Nd and Sm, A is a second element selected from the group consisting of Mg, Ca, Sr, Ba, Na, K and Cs, and B is a third element selected from the group consisting of Fe, Co, Ni and Mn, wherein each of said first and second powders has an average particle diameter of not greater than 4 μm.

2. A catalyst system according to claim 1, wherein said average particle diameter is not less than 2 μm.

3. A catalyst system according to claim 1, wherein said noble metal of said first powder is palladium and rhodium.

4. A catalyst system according to claim 1, wherein said noble metal of said first powder is palladium.

5. A catalyst system according to claim 1, wherein said first catalyst further comprises a fourth element selected from the group consisting of alkali oxide and alkali earth oxide.

6. A catalyst system according to claim 5 wherein said fourth element is in an amount of 1–40 g per liter of said first catalyst.

7. A catalyst system according to claim 1, wherein said noble metal of said first powder is in an amount of 0.1 g per liter of said first catalyst.

8. A catalyst system according to claim 1, wherein said porous carrier of said first powder is an activated alumina having a specific surface area of 50–300 m²/g.

9. A catalyst system according to claim 1, wherein said α of said general formula (1) is not less than 0.2.

10. A catalyst system according to claim 1, where said δ of said general formula (1) is less than about 4.

11. A catalyst system according to claim 1, wherein said first double oxide of said second powder is in an amount of 20–100 g per liter of said first catalyst.

12. A catalyst system for purifying an exhaust gas, said catalyst system comprising a first catalyst for purifying a NOx of the exhaust gas, said first catalyst comprising:

a first powder comprising a porous carrier and a noble metal loaded on said porous carrier, said noble metal being selected from the group consisting of platinum, palladium and rhodium; and a second powder comprising a first double oxide represented by the following general formula (1):

$$(Ln_{1-\alpha}A_\alpha)_{1-\beta}BO_\delta \qquad (1)$$

where $\alpha$ is a number that is greater than 0 and less than 1, $\beta$ is a number that is greater than 0 and less than 1, $\delta$ is a number that is greater than 0, Ln is a first element selected from the group consisting of La, Ce, Nd and Sm, A is a second element selected from the group consisting of Mg, Ca, Sr, Ba, Na, K and Cs, and B is a third element selected from the group consisting of Fe, Co, Ni and Mn, wherein said catalyst system further comprises a second catalyst that is upstream of said first catalyst in a passage of said exhaust gas.

13. A catalyst system according to claim 12, wherein said second catalyst comprises a second double oxide that is a combination of an alumina and a fifth element selected from the group consisting of Na, Mg, Ca, Sr, Ba, Y and La.

14. A catalyst system according to claim 13, wherein said second catalyst further comprises a sixth element loaded on said second double oxide, said sixth element being selected from the group consisting of Fe, Mn, Co and Ni.

15. A catalyst system according to claim 13, wherein said second double oxide is in an amount of 0.1–200 g per liter of said second catalyst.

16. A catalyst system according to claim 12, wherein said second catalyst comprises an alumina and a third double oxide loaded on said alumina, said third double oxide being a combination of a fifth element selected from the group consisting of Na, Mg, Ca, Sr, Ba, Y and La and a sixth element selected from the group consisting of Fe, Mn, Co and Ni.

17. A catalyst system according to claim 12, wherein said second catalyst comprises a fourth double oxide and a fifth element loaded on said fourth double oxide, said fifth element being selected from the group consisting of Na, Mg, Ca, Sr, Ba, Y and La, said fourth double oxide being a combination of an alumina and a sixth element selected from the group consisting of Fe, Mn, Co and Ni.

18. A catalyst system according to claim 12, wherein said second catalyst comprises a fifth double oxide that is a combination of (1) a fifth element selected from the group consisting of Na, Mg, Ca, Sr, Ba, Y and La, (2) a sixth element selected from the group consisting of Fe, Mn, Co and Ni, and (3) an alumina.

19. A catalyst system according to claim 12, wherein said second catalyst comprises a noble metal.

20. A catalyst system for purifying an exhaust gas, said catalyst system comprising a first catalyst for purifying a NOx of the exhaust gas, said first catalyst comprising:

a first powder comprising a porous carrier and a noble metal loaded on said porous carrier, said noble metal being selected from the group consisting of platinum, palladium and rhodium; and a second powder comprising a first double oxide represented by the following general formula (1):

$$(Ln_{1-\alpha}A_\alpha)_{1-\beta}BO_\delta \qquad (1)$$

where $\alpha$ is a number that is greater than 0 and less than 1, $\delta$ is a number that is greater than 0 and less than 1, $\delta$ is a number that is greater than 0, Ln is a first element selected from the group consisting of La, Ce, Nd and Sm, A is a second element selected from the group consisting of Mg, Ca, Sr, Ba, Na, K and Cs, and B is a third element selected from the group consisting of Fe, Co, Ni and Mn, wherein said first catalyst further comprises:
a refractory inorganic substrate;
a base layer formed on said substrate, said base layer comprising said second powder; and
a surface layer formed on said base layer,
wherein said first powder is loaded on at least one of said base layer and said surface layer,
wherein said base layer and said surface layer respectively further comprise first and second elements each being selected from the group consisting of alkali metals, alkali earth metals, rare earth elements and transition metals, said first element of said base layer being represented by M in the following reaction formula (1) and being such that $dM_p(SO_4)_q$ in a reaction represented by the following reaction formula (1) has a Gibbs energy of reaction of not greater than −350 kJ/mol, $$aO_2 + bSO_2 + cM_xO_y \rightarrow dM_p(SO_4)_q \qquad (1)$$

where a, b, c and d are numbers such that the reaction formula (1) is formed, and x, y, p and q are numbers each being greater than 0, said second element being represented by M' in the following reaction formula (2) and being such that $dM'_p(SO_4)_q$ in a reaction represented by the following reaction formula (2) has a Gibbs energy of reaction of greater than −350 kJ/mol, $$aO_2 + bSO_2 + cM'_xO_y \rightarrow dM'_p(SO_4)_q \qquad (2)$$

where a, b, c and d are numbers such that the reaction formula (2) is formed, and x, y, p and q are numbers each being greater than 0.

21. A catalyst system according to claim 20, wherein a weight ratio of said base layer to said surface layer is from 1:3 to 3:1.

22. A catalyst system according to claim 20, wherein said first element of said base layer is an element selected from the group consisting of Na, K, Ba and Cs.

23. A catalyst system according to claim 20, wherein said second element of said surface layer is an element selected from the group consisting of Mg, Ca, Fe, Co and La.

24. A catalyst system according to claim 20, wherein said first catalyst further comprises an interlayer interposed between said base layer and said surface layer, said interlayer comprising a material selected from the group consisting of zeolite, $TiO_2$, $SiO_2$ and $ZrO_2$.

25. A catalyst system according to claim 20, wherein said base layer comprises a third powder containing said first element, said surface layer comprises a fourth powder containing said second element, and each of said third and fourth powders has an average particle diameter of not greater than 4 $\mu$m.

26. A catalyst system according to claim 20, wherein said catalyst system further comprises a second catalyst that is downstream of said first catalyst, said second catalyst comprising a noble metal selected from the group consisting of platinum, palladium and rhodium.

27. A catalyst system according to claim 20, wherein at least a part of said first and second elements of said base and surface layers is loaded on an activated alumina.

28. A method of producing a catalyst system for purifying an exhaust gas, said catalyst system comprising a first catalyst for purifying a NOx of the exhaust gas, said method comprising:

(a) preparing an aqueous slurry containing therein first and second powders, said first powder comprising a porous carrier and a noble metal loaded on said porous carrier, said noble metal being selected from the group consisting of platinum, palladium and rhodium, said second powder consisting essentially of a double oxide represented by the following general formula (1):

$$(Ln_{1-\alpha}A_\alpha)_{1-\beta}BO_\delta \qquad (1)$$

where $\alpha$ is a number that is greater than 0 and less than 1, $\delta$ is a number that is greater than 0 and less than 1, $\delta$ is a number that is greater than 0, Ln is a first element selected from the group consisting of La, Ce, Nd and Sm, A is a second element selected from the group consisting of Mg, Ca, Sr, Ba, Na, K and Cs, and B is a third element selected from the group consisting of Fe, Co, Ni and Mn;

(b) applying said aqueous slurry to a substrate of said first catalyst, such that a precursor of a catalytic coating of said first catalyst is formed on said substrate; and (c) baking said precursor into said catalytic coating.

29. A method according to claim 28, wherein, prior to said applying, said aqueous slurry is subjected to a wet grinding, thereby to adjust each of said first and second powders to having an average particle diameter of not greater than 4 μm.

30. A method according to claim 28, wherein said baking is conducted at a temperature of 400–900° C.

31. A method according to claim 28, further comprising:

(d) preparing an aqueous solution containing a compound of a fourth element selected from the group consisting of alkali metals and alkali earth metals;

(e) applying said aqueous solution to said catalytic coating of said first catalyst, thereby to form another coating on said catalytic coating;

(f) drying said another coating; and (g) after said drying, baking said another coating at a temperature of 200–600° C., thereby to turn said another coating to an oxide of said fourth element.

32. A method according to claim 28, wherein, prior to said applying, each of said first and second powders is adjusted to have an average particle size of not greater than 4 μm.

* * * * *